(12) United States Patent
Peng et al.

(10) Patent No.: US 11,994,667 B1
(45) Date of Patent: May 28, 2024

(54) EYEPIECE OPTICAL ASSEMBLY, SYSTEM AND DEVICE

(71) Applicant: Shenzhen NED Optics Co., Ltd, Shenzhen (CN)

(72) Inventors: Huajun Peng, Shenzhen (CN); Hongpeng Cao, Shenzhen (CN); Jianfei Guo, Shenzhen (CN)

(73) Assignee: Shenzhen NED Optics Co., Ltd, Shenzhen (CN)

( * ) Notice: Subject to any disclaimer, the term of this patent is extended or adjusted under 35 U.S.C. 154(b) by 0 days.

(21) Appl. No.: 18/434,086

(22) Filed: Feb. 6, 2024

(30) Foreign Application Priority Data

Feb. 16, 2023 (CN) .......................... 202310122818.X

(51) Int. Cl.
*G02B 25/00* (2006.01)
(52) U.S. Cl.
CPC .................................. *G02B 25/001* (2013.01)
(58) Field of Classification Search
CPC .................................................... G02B 25/001

USPC .......................................................... 359/643
See application file for complete search history.

(56) References Cited

FOREIGN PATENT DOCUMENTS

| CN | 110543021 A | 12/2019 |
|---|---|---|
| CN | 114280783 A | 4/2022 |
| JP | 2020095073 A | 6/2020 |

*Primary Examiner* — William Choi
(74) *Attorney, Agent, or Firm* — Nitin Kaushik

(57) ABSTRACT

The present invention relates to an eyepiece optical assembly, system and device. The assembly includes a first optics group, a second optics group and a third optics group arranged in sequence along an optical axis from a human eye viewing side to a miniature display. The first optics group includes a first lens group, a first polarizer group and a first waveplate group, the second optics group includes a second lens group and a transflective optical surface, and the third optics group includes a third lens group, a second waveplate group and a second polarizer group. Imaging light is emitted from the miniature display and is reflected and refracted back and forth between the first optics group and the second optics group, and finally exits from the first optics group close to the human eye viewing side into a human eye for imaging.

14 Claims, 35 Drawing Sheets

EYEPIECE OPTICAL ASSEMBLY, SYSTEM AND DEVICE

CROSS-REFERENCE TO RELATED APPLICATIONS

The application claims priority to Chinese patent application No. 202310122818.X, filed on Feb. 16, 2023, the entire contents of which are incorporated herein by reference.

TECHNICAL FIELD

The present invention relates to head-mounted display device optical systems, and more specifically, to an eyepiece optical assembly, system and device.

BACKGROUND

The head-mounted display unit directs the video image light emitted by a miniature image display (e.g., a transmissive or reflective LCD display, an organic electroluminescent device, DMD device) to a user's pupil through some optical imaging technologies to realize virtual and enlarged images in the user's near-eye range, so as to provide the user with intuitive and visual images, videos, and text information, which can be used in outdoor, simulated driving, exercising, demonstration, teaching, training, medical, flight and other scenarios.

With continuous advancement of optical technology and the rapid changes in optical materials, under changes of various optical imaging technologies, especially the iterative technology of polarization control material being more prominent, the pancake optical technology of the present invention has been derived. The requirements for hard performance indicators such as large field of view, lightness, and high definition for the eyepiece optical assembly of the head-mounted display unit are also constantly increasing. The eyepiece optical assembly also needs to have high cost performance, easy mass production and high quality and other characteristics as much as possible. So, it is a great challenge for system design and aberrations optimization to meet the above optical performances at the same time.

A common eyepiece optical assembly of a pancake optical system is composed of multiple lens combinations. Many documents propose respective designs based on this structure. For example, Patent Document 1 (Chinese Patent Publication No. CN214311096U) and Patent Document 2 (Chinese Patent Publication No. CN108957732A) respectively adopt an optical system composed of a catadioptric pancake optical system, which achieves better processability. However, the above-mentioned optical system fails to utilize various cooperative relationships among various polarizing films and between the polarizing film and the optical system described in the present invention. Therefore, it cannot achieve ideal optical effects, and the stray light generated is unacceptable, which greatly reduces the contrast and user experience of the optical system.

Patent Document 3 (Chinese Patent Publication No. CN112731666A) discloses an eyepiece optical assembly composed of multiple lenses, which achieves performance indicators such as a large field-of-view angle, high image quality, and low distortion. However, the eyepiece optical assembly relies heavily on the relatively complex Fresnel optical face shape, which has poor processability and is difficult to mass produce.

Patent Document 4 (Chinese Patent Publication No. CN101609208A) discloses an eyepiece optical assembly composed of multiple lenses, which achieves a large field-of-view angle, but has poor aberration correction, large thickness and mass, and poor performance indicators.

The head-mounted display unit develops in the direction of compact size, light weight, convenient wearing, and load reduction. Meanwhile, a large field-of-view angle and visual comfort experience have gradually become key factors to evaluate the quality of the head-mounted display unit. The large field-of-view angle is critical to achieve a visual experience effect of high liveness, and high image quality and low distortion are critical to achieve the comfort of visual experience. To meet these requirements, the eyepiece optical assembly should achieve indicators such as a large field-of-view angle, high image resolution, low distortion, small field curvature, and small volume as far as possible. So, it is a great challenge for system design and aberrations optimization to meet the above optical performances at the same time.

SUMMARY

The technical problems to be solved by the present invention are that the existing optical system has low image quality, distortion, and insufficient field-of-view angle. In view of the above-mentioned defects of the prior art, an eyepiece optical assembly is provided, and an eyepiece optical system and an eyepiece optical device are also provided.

The technical solutions adopted by the present invention to solve the technical problems are:

an eyepiece optical assembly is provided, which includes a first optics group, a second optics group and a third optics group arranged in sequence along an optical axis from a human eye viewing side to a miniature display;

the first optics group includes a first lens group, a first polarizer group and a first waveplate group, the second optics group includes a second lens group and a transflective optical surface, and the third optics group includes a third lens group, a second waveplate group and a second polarizer group;

an optical focal length of the eyepiece optical assembly is F, a length from a first optical surface of the eyepiece optical assembly to the miniature display is D, a combined optical focal length of the first optics group and the second optics group is F12, a combined center thickness of the first optics group and the second optics group is D1, an optical focal length of the third optics group is F3, and a center thickness of the third optics group is D2;

F, F12, D1, F3, and D2 satisfy the following relations:

$1.1 \leq F12/F \leq 1.8;$ $1.13 \leq F3/F \leq 1.98;$ $0.56 \leq F12/F3 \leq 1.59;$ $0.47 \leq D1/D \leq 0.73;$ $0.2 \leq D2/D \leq 0.53;$ $0.28 \leq D1/D2 \leq 1.12.$ According to the eyepiece optical assembly of the present invention, wherein an optical focal length of the first lens group is f1, an optical focal length of the second lens group is f2, and an optical focal length of the third lens group is f3;

f1, f2 and f3 satisfy the following relations:

$-3.05 \leq f1/f2 \leq 33.21$;

$0.13 \leq f3/f2 \leq 0.42$;

$-11.88 \leq f1/f3 \leq 79.84$.

According to the eyepiece optical assembly of the present invention, a curvature radius of the last optical surface of the second optics group away from the human eye is R6, and a curvature radius of the first optical surface of the third optics group close to the human eye is R7; and R6 and R7 satisfy the following relation:

$-6.13 \leq R6/R7 \leq 5.85$;

According to the eyepiece optical assembly of the present invention, wherein materials of the optical lenses of the first lens group, the second lens group and the third lens group are glass or plastic resin.

According to the eyepiece optical assembly of the present invention, wherein the optical surfaces of the first lens group, the second lens group and the third lens group include one or more of optical spherical surfaces, optical planes and optical even-order aspherical surfaces; and the even-order aspherical face shape satisfies the following relation:

$$z = \frac{cr^2}{1 + \sqrt{1 - (1+k)c^2 r^2}} + a_2 r^2 + a_4 r^4 + a_6 r^6 + \ldots;$$

wherein z is a vector height of the optical surface, c is a curvature at the aspherical vertex, k is an aspherical coefficient, α2, α4, α6 . . . are coefficients of various orders, and r is a distance coordinate from a point on a curved surface to an optical axis of the lens system.

According to the eyepiece optical assembly of the present invention, wherein the first polarizer group includes a polarizer a in which light of one polarization state of P light and S light of natural light is reflected and light of the other polarization state transmits, and includes N polarizers bN in which light of one polarization state of P light and S light of natural light is absorbed and light of the other polarization state transmits, wherein N is a natural number;

the first waveplate group includes K waveplates cK with a quarter phase retardation for polarized light, and includes J waveplates dJ with a half phase retardation for polarized light, wherein K is a positive integer greater than or equal to 1, and J is a natural number;

the second waveplate group includes Z waveplates eZ with a quarter phase retardation for polarized light, and includes Y waveplates fY with a half phase retardation for polarized light, wherein Z is a positive integer greater than or equal to 1, and Y is a natural number;

the second polarizer group includes M polarizers gM in which light of one polarization state of P light and S light of natural light is absorbed and light of the other polarization state transmits, and includes X waveplates hX with a half phase retardation for polarized light, wherein M is a positive integer greater than or equal to 1, X is a natural number, and M is a positive integer greater than or equal to 1.

a polarizing angle of the polarizer a is θa, taking θa as a reference, polarizing angles of the polarizers b0, b1, b2, b3 . . . bN relative to the polarizer a are θb0, θb1, 0)2, θb3 . . . θbN, polarizing angles of the waveplates c1, c2, c3 . . . cK relative to the polarizer a are θc1, θc2, θc3 . . . θcK, polarizing angles of the waveplates d0, d1, d2, d3 . . . dJ relative to the polarizer a are θd0, θd1, θd2, θd3 . . . θdJ, polarizing angles of the waveplates e1, e2, e3 . . . eZ relative to the polarizer a are θe1, θe2, θe3 . . . θeZ, polarizing angles of the waveplates f0, f1, f2, f3 . . . fY relative to the polarizer a are θf0, θf1, θf2, θf3 . . . θfY, polarizing angles of the polarizers g1, g2, g3 . . . gM relative to the polarizer a are θg1, θg2, θg3 . . . θgM, and polarizing angles of the waveplates h0, h1, h2, h3 . . . hX relative to the polarizer a are θh0, θh1, θh2, θh3 . . . θhX, wherein θbN, θcK, θdJ, θeZ, θfY, θgM and θhX satisfy the following relations:

$|\theta bN| \leq 10°$;

$|\theta cK + \theta dJ - (J+1)45°| \leq 10°$;

$|\theta cK - \theta c(K-1)| \leq 10°$;

$|(15°/J) - \theta d1| \leq 3°$;

$|\theta eZ + \theta fY - (Y+1)45°| \leq 10°$;

$|\theta eZ - \theta e(Z-1)| \leq 10°$;

$|(15°/Y) - \theta f1| \leq 3°$;

$|\theta gM| \leq 10°$;

$|\theta hX - \theta h(X-1)| \leq 10°$.

According to the eyepiece optical assembly of the present invention, the polarizer a and the polarizer bN are attached to one or more optical surfaces of the first lens group.

According to the eyepiece optical assembly of the present invention, the waveplate cK and waveplate dJ are attached together and located between glued surfaces formed by gluing the first optical surface of the first optics group close to the miniature display and the first optical surface of the second optics group close to the human eye.

According to the eyepiece optical assembly of the present invention, wherein the waveplate eZ and the waveplate fY are attached to one or more optical surfaces of the third optics group and the miniature display; the polarizer gM and the waveplate hX are attached to one or more optical surfaces of the third optics group and the miniature display; and along the optical axis from the human eye viewing side to the miniature display, the waveplate eZ and the waveplate fY are located upstream the polarizer gM and the waveplate hX.

According to the eyepiece optical assembly of the present invention, the first polarizer group, the second polarizer group, the first waveplate group and the second waveplate group are all made of plastic resin.

According to the eyepiece optical assembly of the present invention, the first lens group consists of a first lens and a second lens, and the optical surface of the second lens close to the human eye is concave to the human eye and convex to the miniature display.

According to the eyepiece optical assembly of the present invention, the glue or material used in the gluing and attaching operations is optical grade adhesive material.

An eyepiece optical system is provided, wherein the eyepiece optical system includes the above eyepiece optical assembly.

An eyepiece optical device is provided, including two miniature displays corresponding to positions of left and right eyes of a person respectively, and further including the above-mentioned optical system, the optical system is arranged at a position between the human eye and the miniature display, and projects a image displayed by the miniature display into the human eye with characteristics of high image quality, low distortion, and large field-of-view angle.

According to the eyepiece optical device of the present invention, the miniature display is an organic electroluminescent device or a transmissive liquid crystal display.

The present invention has following beneficial effects that: the optical system of the eyepiece adopts a pancake folding optical system, and through arrangement and combination of the first lens group, the first polarizer group and the first waveplate group, the second lens group and the transflective optical surface, and the third lens group, the second waveplate group and the second polarizer group, in conjunction with combination of the focal lengths of the lenses and the polarization control of the polarizing component as well as the cooperation relationship of the present invention, the imaging light is emitted from the miniature display and is reflected and refracted back and forth between the first optics group and the second optics group, and finally exits from the first optics group close to the human eye viewing side into the human eye for imaging, which effectively improves the defects of the existing technology and has excellent stray light effects, and good processability, and also achieves performance indicators such as a large field-of-view angle, low distortion, and high optical resolution, reduces manufacturing difficulty, manufacturing cost, and product weight of the eyepiece optical assembly, and greatly improves an optical performance of the system and a user experience of the product. An observer can watch large images of full frame, high definition and uniform image quality without any distortion to get a visual experience of high liveness via the eyepiece optical assembly of the present invention.

BRIEF DESCRIPTION OF THE DRAWINGS

In order to illustrate technical solutions of embodiments of the present invention or the prior art more clearly, the present invention will be further illustrated below with reference to accompanying drawings and embodiments. The accompanying drawings described below are merely some embodiments of the present invention, and for those of ordinary skill in the art, other accompanying drawings can be obtained according to these accompanying drawings without creative effort.

DETAILED DESCRIPTION OF THE EMBODIMENTS

Figure 1:
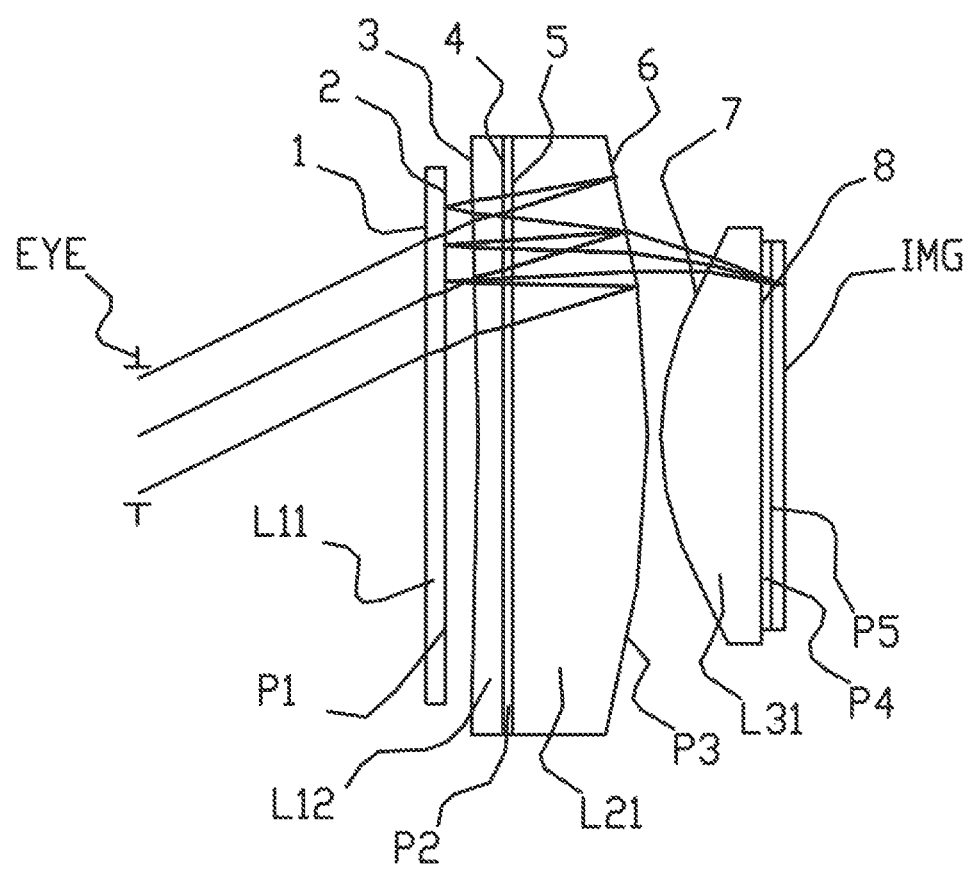
FIG. 1 is a schematic structural diagram of an eyepiece optical assembly according to Example 1 of the present invention.
Figure 2:
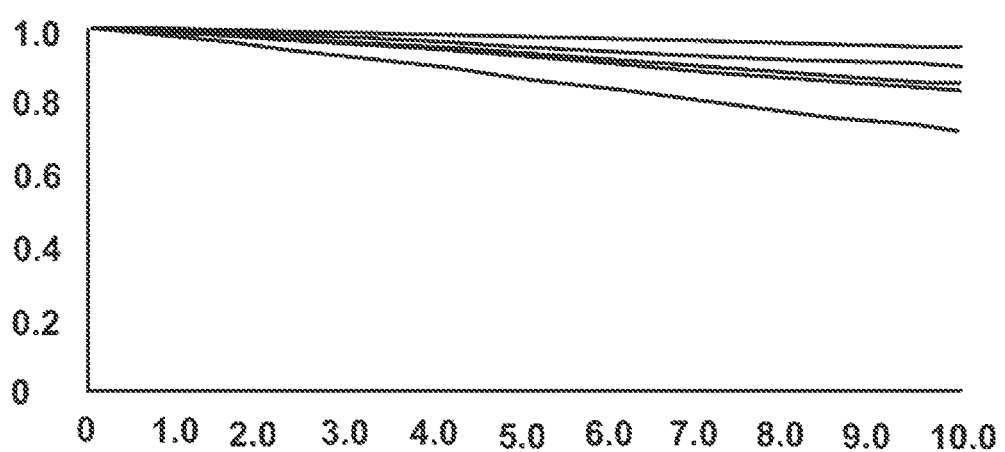
FIG. 2 is a schematic diagram of an optical modulation transfer function MTF of the eyepiece optical assembly according to Example 1 of the present invention.
Figure 3:
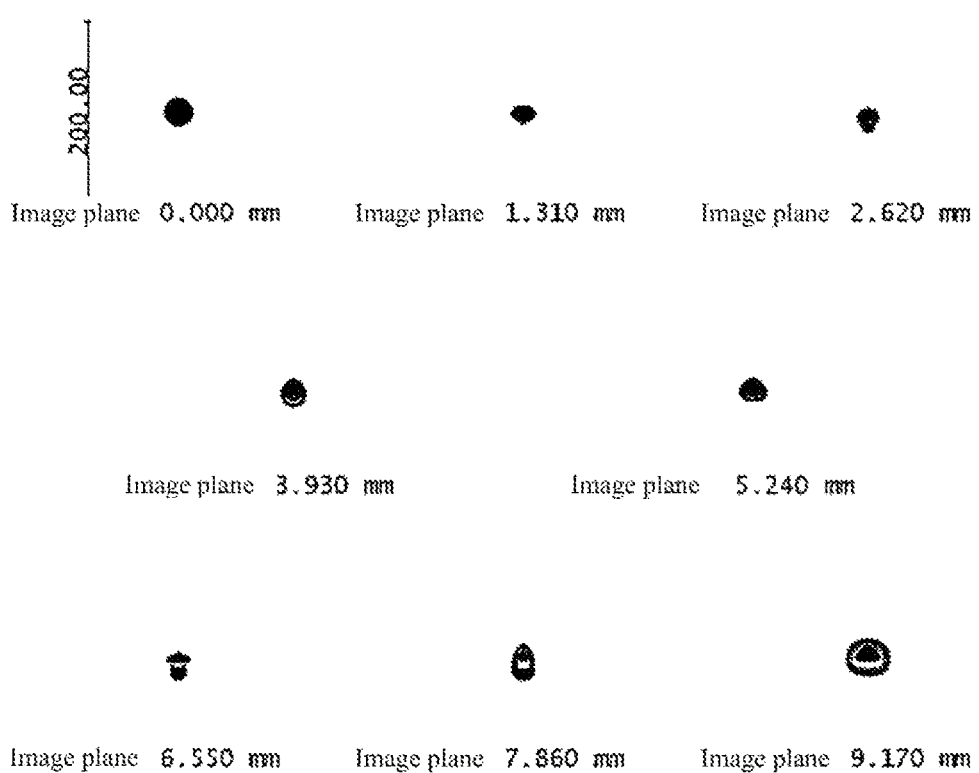
FIG. 3 is a schematic diagram of dispersion spots of the eyepiece optical assembly according to Example 1 of the present invention.
Figure 4A:
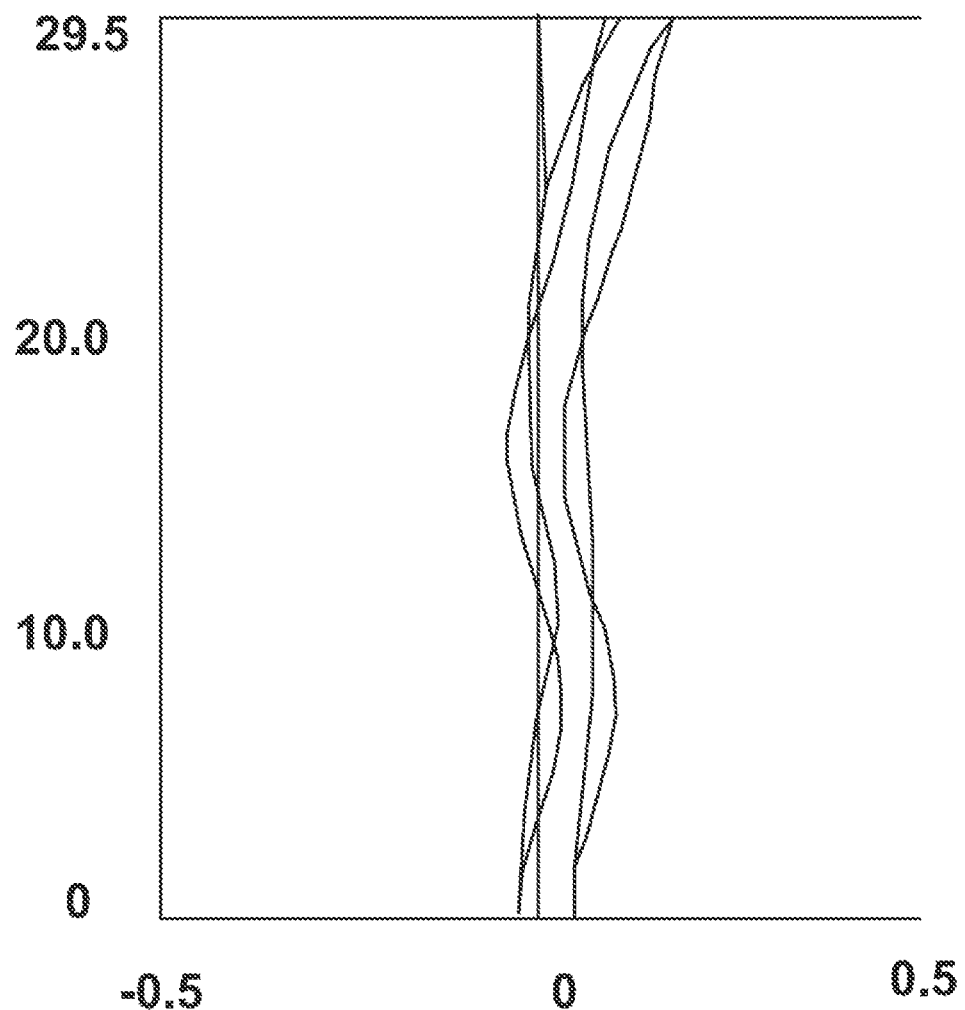
FIGS. 4a and 4b are schematic diagrams of field curvature and distortion of the eyepiece optical assembly according to Example 1 of the present invention.
Figure 4B:
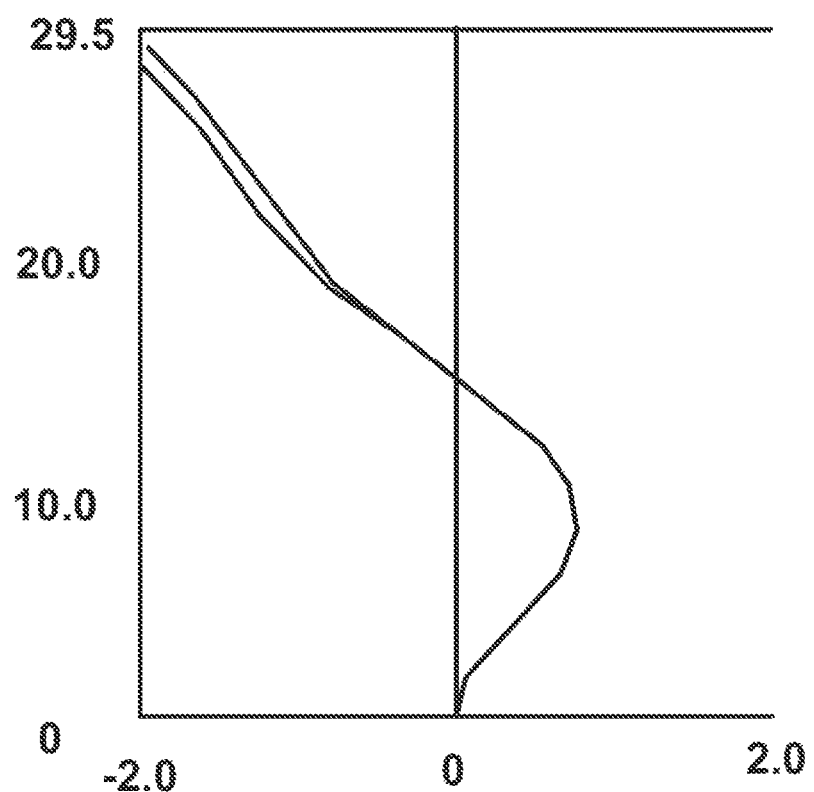

In order to clarify the objects, technical solutions and advantages of the embodiments of the present invention, the following clear and complete description will be made for the technical solution in the embodiments of the present invention. Apparently, the described embodiments are just some rather than all embodiments of the present invention. All other embodiments obtained by one of ordinary skill in the art without any creative effort based on the embodiments disclosed in the present invention fall into the scope of the present invention.

An eyepiece optical assembly is provided, which includes a first lens group (L1), a first polarizer group (P1) and a first waveplate group (P2) arranged in sequence along an optical axis from a human eye viewing side to a miniature display, a second optics group (A2) includes a second lens group (L2) and a transflective optical surface (P3), and a third optics group (A3) includes a third lens group (L3), a second waveplate group (P4) and a second polarizer group (P5);

the first polarizer group (P1) and the second polarizer group (P5) each include at least one polarizer, the first waveplate group (P2) and the second waveplate group (P4) each include at least one waveplate, and the first lens group (L1), the second lens group (L2) and the third lens group (L3) each include at least one optical lens;

the first polarizer group (P1) includes a polarizer in which light of one polarization state of P light and S light of natural light is reflected and light of the other polarization state transmits;

the first waveplate group (P2) and the second waveplate group (P4) each include at least one waveplate with a quarter phase retardation for polarized light;

the second polarizer group (P5) includes at least one polarizer in which light of one polarization state of P light and S light of natural light is absorbed and light of the other polarization state transmits;

the second waveplate group (P4) and the second polarizer group (P5) are attached to an optical surface in the third lens group (L3) or a surface of the miniature display, and the second waveplate group (P4) is located close to the human eye and away from the miniature display, and the second polarizer group (P5) is located away from the human eye and close to the miniature display;

the first lens group (L1) of the first optics group (A1) includes a first optical surface 1, a second optical surface 2, a third optical surface 3 and a fourth optical surface 4, the first optical surface 1 is an optical surface that is convex to the human eye and concave to the miniature display, the first waveplate group (P2) is attached to the fourth optical surface 4 close to the miniature display, and the first polarizer group (P1) is attached to one or more optical surfaces of the first lens group (L1) close to the human eye;

the second lens group (L2) of the second optics group (A2) includes a fifth optical surface 5, a sixth optical surface 6 and a transflective optical surface (P3), the sixth optical surface 6 is an optical surface that is concave to the human eye and convex to the miniature display, and the transflective optical surface (P3) is located on the sixth optical surface 6;

the fourth optical surface 4 of the first optics group (A1) close to the miniature display and the fifth optical surface 5 of the second optics group (A2) close to the human eye glue the first waveplate group (P2) to one component through attaching process;

the seventh optical surface 7 of the third optics group (A3) close to the human eye is an optical surface that is convex to the human eye and concave to the miniature display, and the eighth optical surface 8 of the third optics group (A3) is away from the human eye;

a optical focal length of the eyepiece optical assembly is F, a length from the first optical surface of the eyepiece optical assembly to the miniature display is D, a combined optical focal length of the first optics group (A1) and the second optics group (A2) is F12, a combined center thickness of the first optics group (A1) and the second optics group (A2) is D1, an optical focal length of the third optics group (A3) is F3, a center thickness of the third optics group (A3) is D2, and F, F12, D1, F3, and D2 satisfy the following relations (1), (2), (3), (4), (5), (6):

$$1.1 \le F12/F \le 1.8 \quad (1),$$

$$1.13 \le F3/F \le 1.98 \quad (2),$$

$$0.56 \le F12/F3 \le 1.59 \quad (3),$$

$$0.47 \le D1/D \le 0.73 \quad (4),$$

$$0.2 \le D2/D \le 0.53 \quad (5),$$

$$0.28 \le D1/D2 \le 1.12 \quad (6);$$

wherein a value of F12/F may be 1.1, 1.12, 1.21, 1.33, 1.44, 1.58, 1.651, 1.735, 1.8, etc., a value of F3/F may be 1.13, 1.22, 1.34, 1.53, 1.66, 1.78, 1.851, 1.935, 1.98, etc., a value of F12/F3 may be 0.56, 0.86, 1.11, 1.125, 1.213, 1.34, 1.53, 1.59, etc., a value of D1/D may be 0.47, 0.531, 0.581, 0.641, 0.671, 0.681, 0.73, etc., a value of D2/D may be 0.2, 0.231, 0.251, 0.36, 0.371, 0.421, 0.473, 0.513, 0.53, etc., and a value of D1/D2 may be 0.28, 0.31, 0.51, 0.6, 0.71, 0.81, 0.973, 1.12, etc.

An optical focal length of the first lens group (L1) is f1, an optical focal length of the second lens group (L2) is f2, an optical focal length of the third lens group (L3) is f3, and f1, f2 and f3 satisfy the following relations (7), (8) and (9):

$$1.1 \le F12/F \le 1.8 \quad (1),$$

$$-3.05 \le f1/f2 \le 33.21 \quad (7),$$

$$0.13 \le f3/f2 \le 0.42 \quad (8),$$

$$-11.88 \le f1/f3 \le 79.84 \quad (9);$$

wherein a value of f1/f2 may be −3.05, −2.12, −1.21, −0.3, 1.44, 11.8, 22.6, 23.7, 33.21, etc., a value of f3/f2 may be 0.13, 0.135, 0.25, 0.245, 0.331, 0.36, 0.413, 0.42, etc., and a value of f1/f3 may be −11.88, −10.1, −5.25, −0.245, 0.331, 10.36, 22.43, 43.42, 79.84, etc.

A curvature radius of the sixth optical surface 6 of the second optics group (A2) is R6, a curvature radius of the seventh optical surface 7 of the third optics group (A3) close to the human eye is R7, and R6 and R7 satisfy the following relation (3):

$$-6.13 \le R6/R7 \le 5.85 \quad (10);$$

wherein a value of R6/R7 may be −6.13, −5.12, −3.21, −0.37, 1.45, 3.8, 5.6, 5.75, 5.85, etc.

Materials of the optical lenses of the first lens group (L1), the second lens group (L2) and the third lens group (L3) are glass or plastic resin.

The optical surfaces of the first lens group (L1), the second lens group (L2) and the third lens group (L3) are optical spherical surfaces, optical planes and optical even-order aspherical surfaces, and the even-order aspherical face shape satisfies the following relation (11):

$$z = \frac{cr^2}{1+\sqrt{1-(1+k)c^2r^2}} + a_2r^2 + a_4r^4 + a_6r^6 + \ldots; \quad (11)$$

wherein z is a vector height of the optical surface, c is a curvature at the aspherical vertex, k is an aspherical coefficient, α2, α4, α6 . . . are coefficients of various orders, and r is a distance coordinate from a point on a curved surface to an optical axis of the lens system.

The first polarizer group (P1) and the second polarizer group (P5), and the first waveplate group (P2) and the second waveplate group (P4) are of plastic resin.

The first polarizer group (P1) includes a polarizer a in which light of one polarization state of P light and S light of natural light is reflected and light of the other polarization state transmits, and includes N polarizers bN in which light of one polarization state of P light and S light of natural light is absorbed and light of the other polarization state transmits, wherein N is a natural number.

The first waveplate group (P2) includes K waveplates cK with a quarter phase retardation for polarized light, and includes J waveplates dJ with a half phase retardation for polarized light, wherein K is a positive integer greater than or equal to 1, and J is a natural number.

The second waveplate group (P4) includes Z waveplates eZ with a quarter phase retardation for polarized light, and includes Y waveplates fY with a half phase retardation for polarized light, wherein Z is a positive integer greater than or equal to 1, and Y is a natural number.

The second polarizer group (P5) includes M polarizers gM in which light of one polarization state of P light and S light of natural light is absorbed and light of the other polarization state transmits, and includes X waveplates hX with a half phase retardation for polarized light, wherein M is a positive integer greater than or equal to 1, X is a natural number, and M is a positive integer greater than or equal to 1.

A polarizing angle of the polarizer a is θa, taking θa as a reference, polarizing angles of the polarizers b0, b1, b2, b3 . . . bN relative to the polarizer a are θb0, θb1, θb2, θb3 . . . θbN, polarizing angles of the waveplates c1, c2, c3 . . . cK relative to the polarizer a are θc1, θc2, θc3 . . . θcK, polarizing angles of the waveplates d0, d1, d2, d3 . . . dJ relative to the polarizer a are θd0, θd1, θd2, θd3 . . . θdJ, polarizing angles of the waveplates e1, e2, e3 . . . eZ relative to the polarizer a are θe1, θe2, θe3 . . . θeZ, polarizing angles of the waveplates f0, f1, f2, f3 . . . fY relative to the polarizer a are θf0, θf1, θf2, θf3 . . . θfY, polarizing angles of the polarizers g1, g2, g3 . . . gM relative to the polarizer a are θg1, θg2, θg3 . . . θgM, and polarizing angles of the waveplates h0, h1, h2, h3 . . . hX relative to the polarizer a are θh0, θh1, θh2, θh3 . . . θhX, wherein θbN, θcK, θdJ, θeZ, θfY, θgM and θhX satisfy the following relations:

|θbN|≤10°;

|θcK+θdJ−(J+1)45°|≤10°;

|θcK−θc(K−1)|≤10°;

|(15°/J)−θd1|≤3°;

|θeZ+θfY−(Y+1)45°|≤10°;

|θeZ−θe(Z−1)|≤10°;

|(15°/Y)−θf1|≤3°;

|θgM|≤10°;

|θhX−θh(X−1)|≤10°.

wherein in θbN, θcK, θdJ, θeZ, θfY, θgM and θhX, N, J, Y and X may be 0, 1, 3, 5, 8, 11, etc., K, Z, M may be 1, 3, 4, 7, 12, etc., values of θb1, θb2 . . . θbN and θg1, θg2, θg3 . . . θgM may be −10°, −5.2°, −3.1°, −0.7°, 1.4°, 2.8°, 3.63°, 5.65°, 10°, etc. respectively.

The polarizer a and polarizer bN are attached to one or several optical surfaces of the first lens group (L1);

the waveplate cK and waveplate dJ are attached together and located between glued surfaces formed by gluing the fourth optical surface 4 of the first optics group (A1) close to the miniature display and the fifth optical surface 5 of the second optics group (A2) close to the human eye;

the waveplate eZ and the waveplate fY, and the polarizer gM and the waveplate hX are attached to one or several optical surfaces of the third optics group (A3) and the miniature display, the waveplate eZ and the waveplate fY are located close to the human eye and away from the miniature display, and the polarizer gM and the waveplate hX are located away from the human eye and close to the miniature display.

The polarizer groups (P1) and (P5) and the waveplate groups (P2) and (P4) are of plastic resin.

The first lens group (L1) consists of a first lens L11 and a second lens L12, and the third optical surface 3 of the second lens L12 close to the human eye is an optical surface that is concave to the human eye and convex to the miniature display.

The glue or material used in the gluing and attaching process is optical grade adhesive material.

The total length, total mass and aberrations (including spherical aberration, coma aberration, distortion, field curvature, astigmatism, chromatic aberration and other high-order aberrations) of the optical system are fully corrected, which facilitates the eyepiece optical assembly to achieve a large field-of-view angle and a large aperture while further improving the image quality of a center of field of view and an edge of field of view, narrowing the difference in image quality between the center of field of view and the edge of field of view, thus, achieving more uniform image quality and low distortion across the entire frame.

The principles, solutions and display results of the above-mentioned eyepiece optical assembly will be further elaborated below through more specific examples.

In the following examples, a diaphragm E can be an exit pupil of imaging of the eyepiece optical assembly, which is a virtual light exit aperture. When the pupil of the human eye is at the diaphragm position, the best imaging effect can be observed. The miniature image display I is an image plane of the eyepiece optical assembly.

Example 1

TABLE 1

| | | | Glass | | | Cone |
|---|---|---|---|---|---|---|
| Surface | Curvature radius | Thickness | Refractive index | Abbe number | Net aperture | co-efficient |
| Human eye | Infinite | 13 | — | — | 4 | — |
| 1 | Infinite | 1 | 1.52 | 64.21 | 23.97 | — |
| 2 | Infinite | 1.73 | — | — | 24.66 | — |
| 3 | −301.34 | 1.31 | 1.95 | 17.94 | 26.31 | — |

TABLE 1-continued

| Surface | Curvature radius | Thickness | Glass Refractive index | Abbe number | Net aperture | Cone co-efficient |
|---|---|---|---|---|---|---|
| 4 | Infinite | 0.50 | 1.53 | 55.79 | 27.22 | — |
| 5 | Infinite | 7.05 | 1.54 | 56.11 | 27.60 | — |
| 6 | −60.44 | 0.00 | MIRROR | | 31.28 | 0.94 |
| 6 | −60.44 | −7.05 | 1.54 | 56.11 | 31.28 | 0.94 |
| 5 | Infinite | −0.50 | 1.53 | 55.79 | 29.42 | — |
| 4 | Infinite | −1.31 | 1.946 | 17.94 | 29.24 | — |
| 3 | −301.34 | −1.73 | — | — | 28.76 | — |
| 2 | Infinite | 1.73 | MIRROR | | 28.06 | — |
| 3 | −301.34 | 1.31 | 1.946 | 17.94 | 27.35 | — |
| 4 | Infinite | 0.50 | 1.53 | 55.8 | 27.03 | — |
| 5 | Infinite | 7.05 | 1.54 | 56.11 | 26.90 | — |
| 6 | −60.44 | 0.69 | — | — | 31.28 | 0.94 |
| 7 | 12.51 | 5.26 | 1.54 | 56.11 | 21.77 | −8.33 |
| 8 | Infinite | 0.5 | 1.53 | 55.8 | 20.30 | — |
| Screen surface | Infinite | 0.7 | 1.52 | 64.21 | 19.92 | — |
| Image plane | Infinite | — | — | — | 18.38 | — |

FIG. 1 is a schematic structural diagram of an optical path of an eyepiece optical assembly according to Example 1, as shown, from a human eye viewing side to a miniature image display side (from left to right), including successively a human eye EYE, a first lens L11, a first polarizer group P1, a second lens L12, a first waveplate group P2, a lens L21 of a second lens group, a transflective reflection surface P3, a lens L31 of a third lens group, a second waveplate group P4 and a second polarizer group P5, wherein the first polarizer group P1 has 1 polarizer b1 in which light of one polarization state is absorbed and light of the other polarization state transmits and which is attached to an optical surface of the lens L11 away from the human eye, and has 1 polarizer a in which light of one polarization state is reflected and light of the other polarization state transmits and which is attached to the polarizer b1, and a polarizing angle θb1 of the polarizer b1 is 1.2° with respect to the polarizer a. The first waveplate group P2 has 1 waveplate c1 with a quarter phase retardation which is attached to an optical surface of the lens L12 away from the human eye, and has 1 waveplate d1 with a half phase retardation for polarized light which is attached to an optical surface of the lens L21 close to the human eye side. The optical surface of L12 away from the human eye side and the optical surface of the lens L21 close to the human eye side sandwich and glue the first waveplate group (P2) to one component by attaching the first optics group (A1) and the second optics group (A2), with respect to the polarizer a, a polarizing angle θc1 of the waveplate c1 is 15.35°, and a polarizing angle θd1 of the waveplate d1 is 78.1°. The second waveplate group P4 has 1 waveplate e1 with a quarter phase retardation which is attached to an optical surface of the lens L31 away from the human eye side, and has 1 waveplate f1 with a half phase retardation for polarized light which is attached to the waveplate e1, and with respect to the polarizer a, a polarizing angle θe1 of the waveplate e1 is 13.4°, and a polarizing angle θf1 of the waveplate f1 is 74.4°. The second polarizer group P5 has 1 polarizer g1 in which light of one polarization state is absorbed and light of the other polarization state transmits and which is attached to a miniature display (IMG), with a polarizing angle θg1 of the polarizer g1 being 0.5° with respect to the polarizer a, and has 1 waveplate h1 with a half phase retardation for polarized light, with a polarizing angle θh1 of the polarizer h1 being 1.2° with respect to the polarizer a. The optical surface of L31 away from the human eye side and the miniature display (IMG) sandwich and glue the second waveplate group (P4) and the second polarizer group (P5) to one component through attaching process. And the material of the first lens L11 of the eyepiece optical assembly is H-K9L, the material of the second lens L12 is H-ZF88, the material of the lens L21 of the second lens group is APL5514, and the material of the lens L31 of the third lens group is APL5514, the optical focal length F of the eyepiece optical assembly is 16.59, and a total design mass of the lenses is 12.11 g. A length D from the first optical surface to the miniature display is 18.74, a combined optical focal length F12 of the first optics group (A1) and the second optics group (A2) is 19.65, a combined center thickness D1 of the first optics group (A1) and the second optics group (A2) is 12.27, and an optical focal length F3 of the third optics group (A3) is 26.8. A center thickness D2 of the third optics group (A3) is 5.26, an optical focal length f1 of the first lens group (L1) is −318.56, an optical focal length f2 of the second lens group (L2) is 104.44, and an optical focal length f3 of the third lens group (L3) is 26.82. A curvature radius R6 of the sixth optical surface 6 of the second optics group (A2) is −60.44, and a curvature radius R7 of the seventh optical surface 7 of the third optics group (A3) close to the human eye is 12.51, that is, D1/D is 0.65, D2/D is 0.28, D1/D2 is 0.43, F12/F is 1.18, F3/F is 1.62, F12/F3 is 0.73, f1/f2 is −3.05, f3/f2 is 0.26, f1/f3 is −11.88, and R6/R7 is −4.83.

FIGS. 2, 3, 4a and 4b are respectively a plot of the optical modulation transfer function MTF, a schematic diagram of dispersion spots, field curvature and distortion diagrams of the eyepiece optical assembly according to Example 1 of the present invention, showing with a large field of view, a resolution value in the schematic diagram of the modulation transfer function MTF at 101p is greater than 0.7, and from the data above, it can be seen that the optical system has high imaging quality, and small field curvature and optical distortion.

Example 2

TABLE 2

| Surface | Curvature radius | Thickness | Glass Refractive index | Abbe number | Net aperture | Cone co-efficient |
|---|---|---|---|---|---|---|
| Human eye | Infinite | 13 | — | — | 4 | — |
| 1 | Infinite | 1.00 | 1.52 | 64.21 | 32 | — |
| 2 | Infinite | 3.11 | — | — | 32 | — |
| 3 | −284.30 | 1.66 | 1.95 | 17.94 | 32 | — |
| 4 | Infinite | 0.50 | 1.53 | 55.80 | 32 | — |
| 5 | Infinite | 5.36 | 1.54 | 56.11 | 32 | — |
| 6 | −60.32 | 0.00 | MIRROR | | 32 | 1.33 |
| 6 | −60.32 | −5.36 | 1.54 | 56.11 | 32 | 1.33 |
| 5 | Infinite | −0.50 | 1.53 | 55.80 | 32 | — |
| 4 | Infinite | −1.66 | 1.95 | 17.94 | 32 | — |
| 3 | −284.30 | −3.11 | — | — | 32 | — |
| 2 | Infinite | 3.11 | MIRROR | | 32 | — |
| 3 | −284.30 | 1.66 | 1.95 | 17.94 | 32 | — |
| 4 | Infinite | 0.50 | 1.53 | 55.80 | 32 | — |
| 5 | Infinite | 5.36 | 1.54 | 56.11 | 32 | — |
| 6 | −60.32 | 0.44 | — | — | 32 | 1.33 |
| 7 | 19.08 | 4.66 | 1.54 | 56.11 | 24 | −3.41 |
| 8 | Infinite | 0.5 | 1.53 | 55.80 | 24 | — |
| Screen surface | Infinite | 0.7 | 1.52 | 64.21 | 20 | — |
| Image plane | Infinite | — | — | — | 18 | — |

Figure 5:
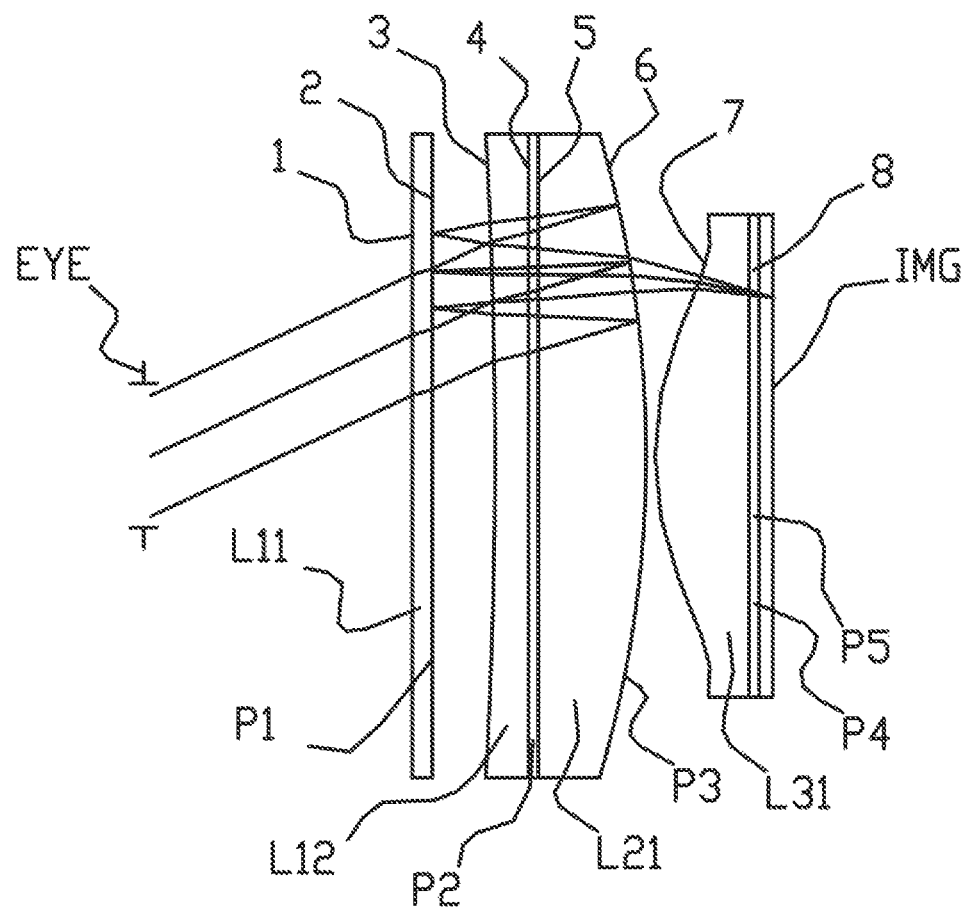
FIG. 5 is a schematic structural diagram of an eyepiece optical assembly according to Example 2 of the present invention.
Figure 6:
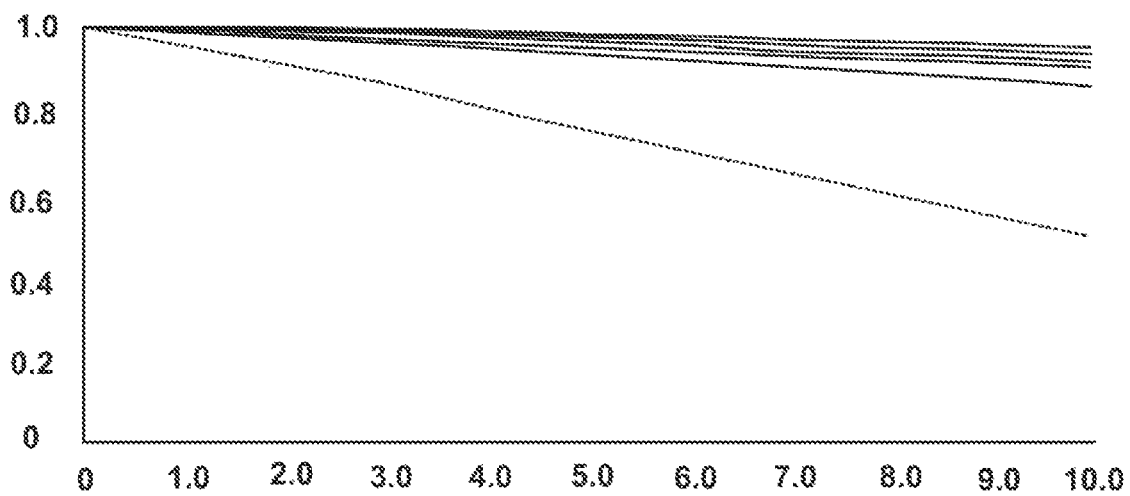
FIG. 6 is a schematic diagram of an optical modulation transfer function MTF of the eyepiece optical assembly according to Example 2 of the present invention.
Figure 7:
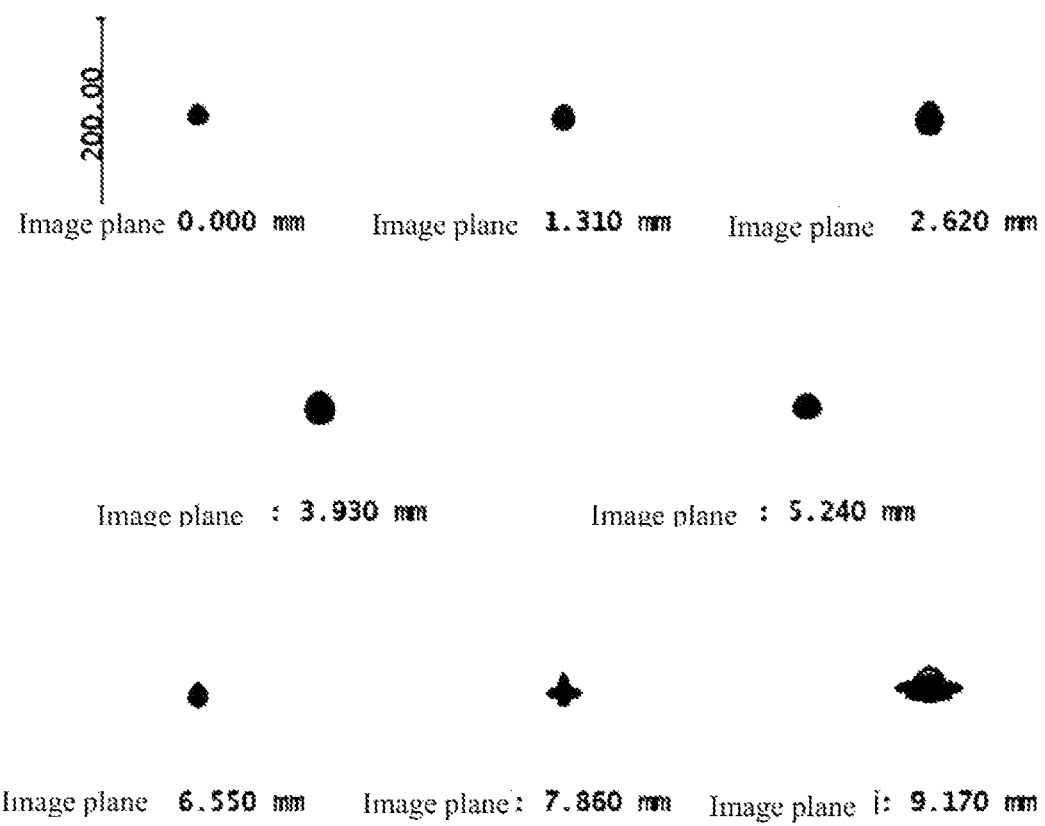
FIG. 7 is a schematic diagram of dispersion spots of the eyepiece optical assembly according to Example 2 of the present invention.
Figure 8A:
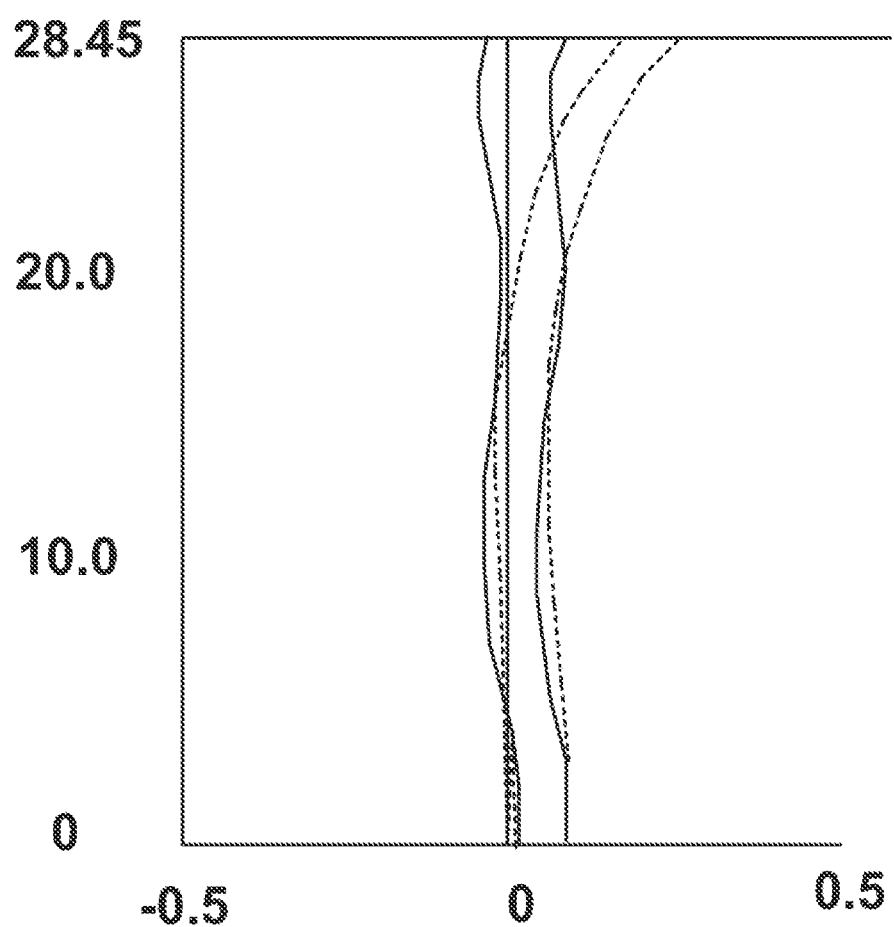
FIGS. 8a and 8b are schematic diagrams of field curvature and distortion of the eyepiece optical assembly according to Example 2 of the present invention.
Figure 8B:
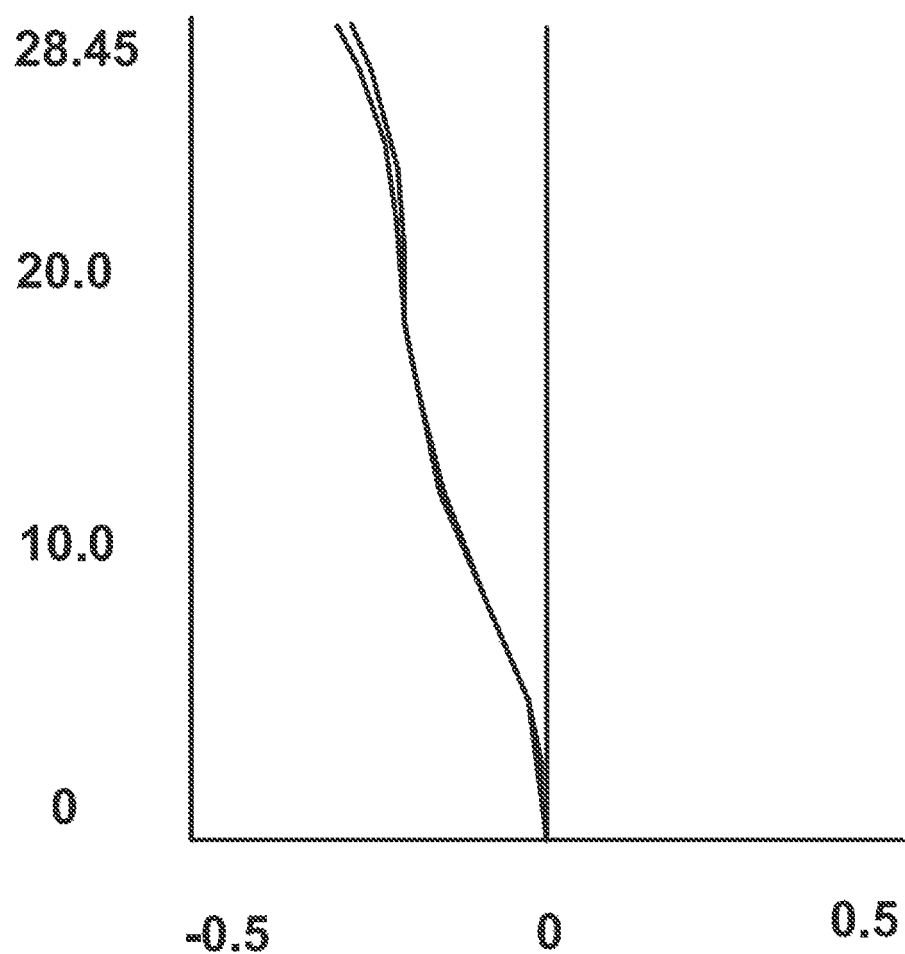

FIG. 5 is a schematic structural diagram of an optical path of an eyepiece optical assembly according to Example 2, as shown, from a human eye viewing side to a miniature image display side (from left to right), including successively a human eye EYE, a first lens L11, a first polarizer group P1, a second lens L12, a first waveplate group P2, a lens L21 of a second lens group, a transflective reflection surface P3, a lens L31 of a third lens group, a second waveplate group P4 and a second polarizer group P5, wherein the first polarizer group P1 has 2 polarizers b1 and b2 in which light of one polarization state is absorbed and light of the other polarization state transmits and which are successively attached to an optical surface of the lens L11 away from the human eye side, with b2 being attached to b1 away from the human eye, and has 1 polarizer a in which light of one polarization state is reflected and light of the other polarization state transmits and which is attached to the polarizer b2, and polarizing angles θb1 and 0b2 of the polarizers b1 and b2 are 5.2° and −3.9° respectively with respect to the polarizer a. The first waveplate group P2 has 1 waveplate c1 with a quarter phase retardation which is attached to an optical surface of the lens L12 away from the human eye side, and has 2 waveplates d1 and d2 with a half phase retardation for polarized light which are successively attached to an optical surface of the lens L21 close to the human eye side. The optical surface of L12 away from the human eye side and the optical surface of the lens L21 close to the human eye side sandwich and glue the first waveplate group (P2) to one component by attaching the first optics group (A1) and the second optics group (A2), with respect to the polarizer a, a polarizing angle θct of the waveplate c1 is 14.75°, and polarizing angles θd1 and θd2 of the waveplates d1 and d2 are 75.81° and 69.81° respectively. The second waveplate group P4 has 1 waveplate e1 with a quarter phase retardation which is attached to an optical surface of the lens L31 away from the human eye side, and has 1 waveplate f1 with a half phase retardation for polarized light which is attached to the waveplate e1, with respect to the polarizer a, a polarizing angle θe1 of the waveplate e1 is 14.4°, and a polarizing angle θf1 of the waveplate f1 is 76.1°. The second polarizer group P5 has 1 polarizer g1 in which light of one polarization state is absorbed and light of the other polarization state transmits and which is attached to a miniature display (IMG), with a polarizing angle θg1 of the polarizer g1 being 1° with respect to the polarizer a, and has 2 waveplates h1 and h2 with a half phase retardation for polarized light, with polarizing angles θh1 and θh2 of the polarizers h1 and h2 being 2.1° and −1.5° with respect to the polarizer a. The optical surface of L31 away from the human eye side and the miniature display (IMG) sandwich and glue the second waveplate group (P4) and the second polarizer group (P5) to one component through attaching process. And the material of the first lens L11 of the eyepiece optical assembly is H-K9L, the material of the second lens L12 is H-ZF88, the material of the lens L21 of the second lens group is APL5514, and the material of the lens L31 of the third lens group is APL5514, the optical focal length F of the eyepiece optical assembly is 17.39, and a total design mass of the lenses is 13.44 g, a length D from the first optical surface to the miniature display is 17.93, a combined optical focal length F12 of the first optics group (A1) and the second optics group (A2) is 19.89, and a combined center thickness D1 of the first optics group (A1) and the second optics group (A2) is 12.07. An optical focal length F3 of the third optics group (A3) is 30.43, a center thickness D2 of the third optics group (A3) is 4.66, an optical focal length f1 of the first lens group (L1) is −300.54, an optical focal length f2 of the second lens group (L2) is 104.07, and an optical focal length f3 of the third lens group (L3) is 30.43. A curvature radius R6 of the sixth optical surface 6 of the second optics group (A2) is −60.32, and a curvature radius R7 of the seventh optical surface 7 of the third optics group (A3) close to the human eye is 19.08, that is, D1/D is 0.67, D2/D is 0.26, D1/D2 is 0.39, F12/F is 1.14, F3/F is 1.75, F12/F3 is 0.65, f1/f2 is −2.89, f3/f2 is 0.29, f1/f3 is −9.88, and R6/R7 is −3.16.

FIGS. 6, 7, 8a and 8b are respectively a plot of the optical modulation transfer function MTF, a schematic diagram of dispersion spots, field curvature and distortion diagrams of the eyepiece optical assembly according to Example 2 of the present invention, showing with a large field of view, a resolution value in the schematic diagram of the modulation transfer function MTF at 101p is greater than 0.5, and from the data above, it can be seen that compared to Example 1, changing different combinations of polarizing assemblies in conjunction with the focal lengths of some lens groups can produce higher imaging quality, smaller field curvature and optical distortion.

Example 3

TABLE 3

| Surface | Curvature radius | Thickness | Glass Refractive index | Abbe number | Net aperture | Cone co-efficient |
|---|---|---|---|---|---|---|
| Human eye | Infinite | 13 | — | — | 4 | — |
| 1 | 63.01 | 3.00 | 1.52 | 64.21 | 28 | — |
| 2 | Infinite | 3.11 | — | — | 28 | — |
| 3 | −235.55 | 1.55 | 1.95 | 17.94 | 28 | — |
| 4 | Infinite | 0.50 | 1.53 | 55.80 | 28 | — |
| 5 | Infinite | 3.46 | 1.54 | 56.11 | 28 | — |
| 6 | −66.47 | 0.00 | MIRROR | | 28 | 1.76 |
| 6 | −66.47 | −3.46 | 1.54 | 56.11 | 28 | 1.76 |
| 5 | Infinite | −0.50 | 1.53 | 55.80 | 28 | — |
| 4 | Infinite | −1.55 | 1.95 | 17.94 | 28 | — |
| 3 | −235.55 | −3.11 | — | — | 28 | — |
| 2 | Infinite | 3.11 | MIRROR | | 28 | — |
| 3 | −235.55 | 1.55 | 1.95 | 17.94 | 28 | — |
| 4 | Infinite | 0.50 | 1.53 | 55.80 | 28 | — |
| 5 | Infinite | 3.46 | 1.54 | 56.11 | 28 | — |
| 6 | −66.47 | 0.50 | — | — | 28 | 1.76 |
| 7 | 13.11 | 3.58 | 1.54 | 56.11 | 22.00 | −5.00 |
| 8 | 184.75 | 0.49 | — | — | 21.29 | — |
| 9 | 95.30 | 2.63 | 1.53 | 56.04 | 24 | — |
| 10 | Infinite | 0.50 | 1.53 | 55.80 | 24 | — |
| Screen surface | Infinite | 0.70 | 1.52 | 64.21 | 20 | — |
| Image plane | Infinite | — | — | — | 18 | — |

Figure 9:
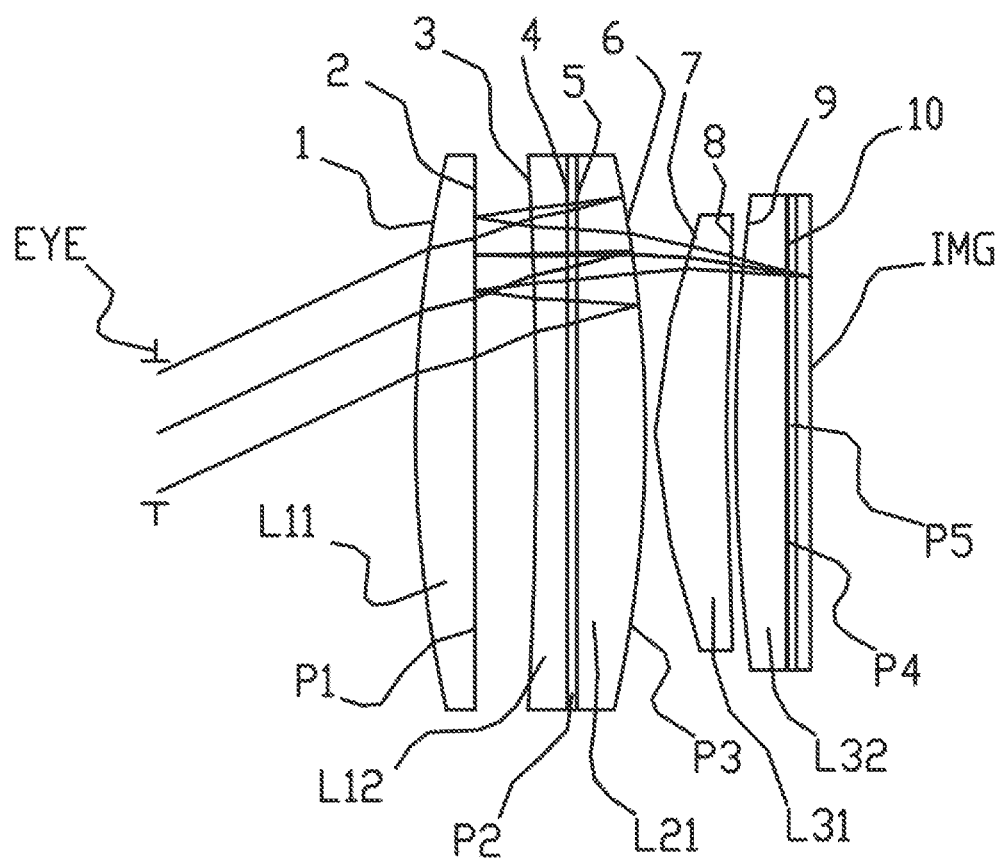
FIG. 9 is a schematic structural diagram of an eyepiece optical assembly according to Example 3 of the present invention.
Figure 10:
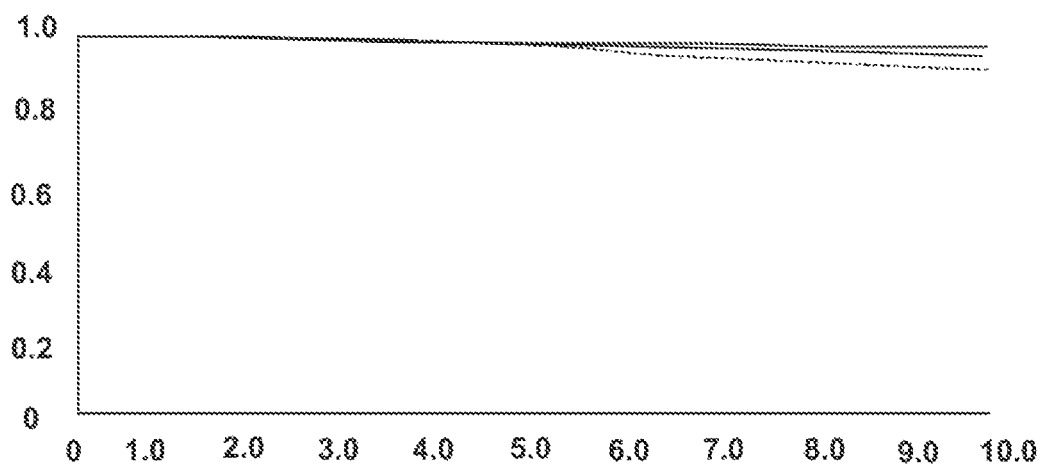
FIG. 10 is a schematic diagram of an optical modulation transfer function MTF of the eyepiece optical assembly according to Example 3 of the present invention.
Figure 11:
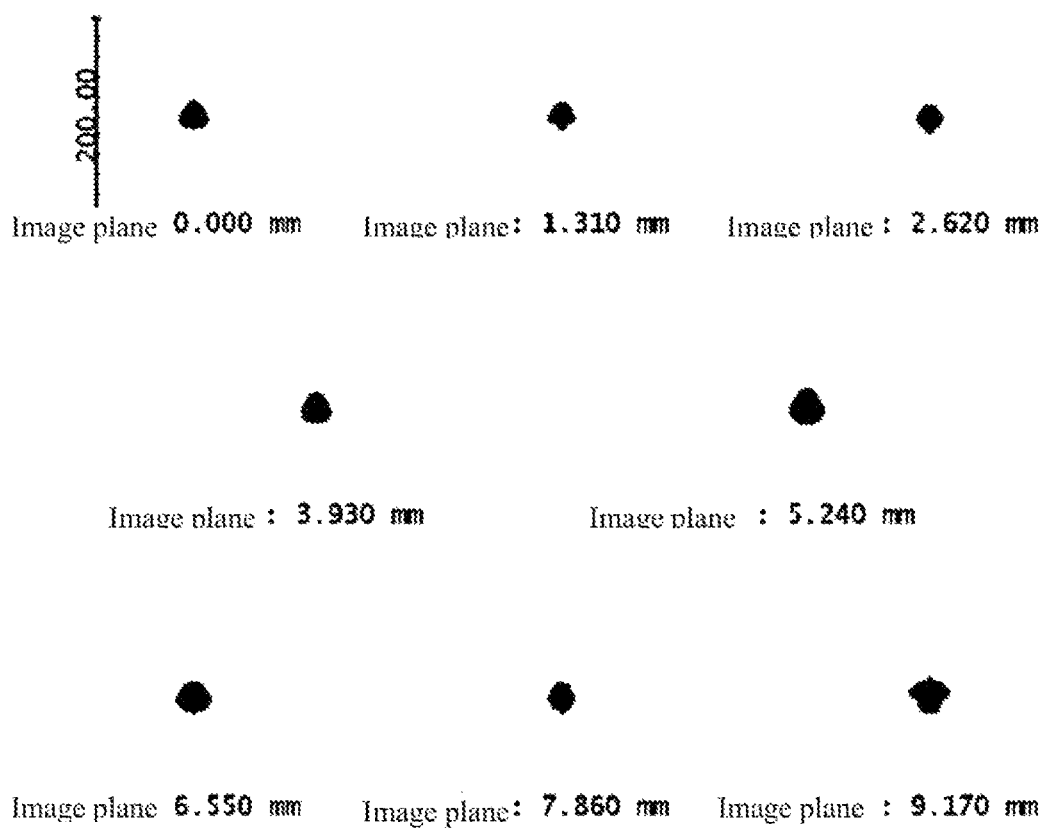
FIG. 11 is a schematic diagram of dispersion spots of the eyepiece optical assembly according to Example 3 of the present invention.
Figure 12A:
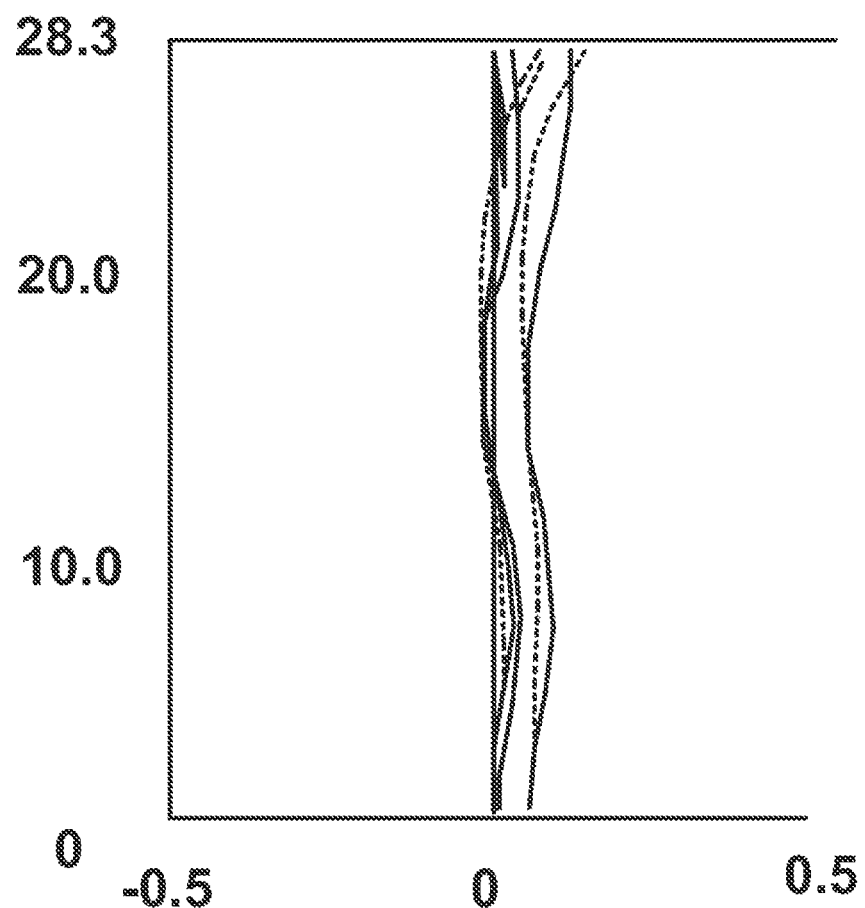
FIGS. 12a and 12b are schematic diagrams of field curvature and distortion of the eyepiece optical assembly according to Example 3 of the present invention.
Figure 12B:
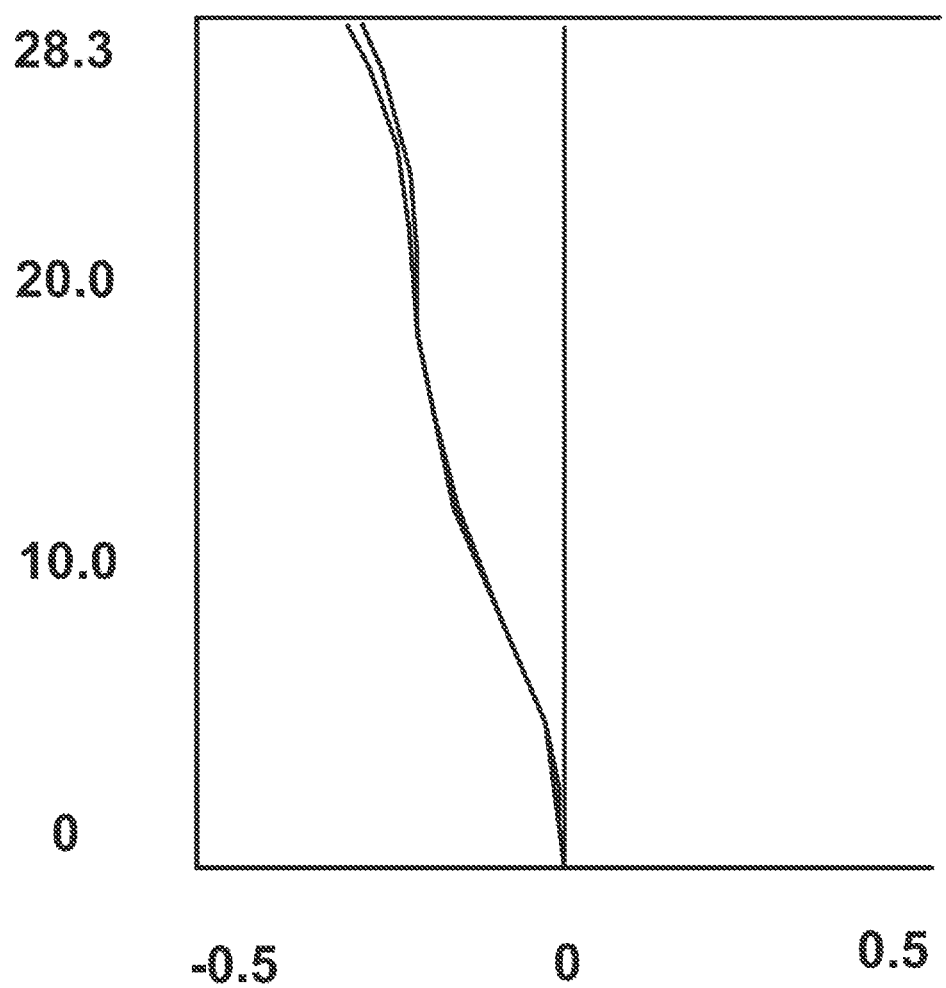

FIG. 9 is a schematic structural diagram of an optical path of an eyepiece optical assembly according to Example 3, as shown, from a human eye viewing side to a miniature image display side (from left to right), including successively a human eye EYE, a first lens L11, a first polarizer group P1, a second lens L12, a first waveplate group P2, a lens L21 of a second lens group, a transflective reflection surface P3, lenses L31 and L32 of a third lens group, a second waveplate group P4 and a second polarizer group P5, wherein the first polarizer group P1 has 2 polarizers b1 and b2 in which light of one polarization state is absorbed and light of the other polarization state transmits and which are successively attached to an optical surface of the lens L11 away from the human eye, and has 1 polarizer a in which light of one polarization state is reflected and light of the other polarization state transmits and which is attached to the polarizer b2, and polarizing angles θb1 and θb2 of the polarizers b1 and b2 are −1.3° and 2.1° respectively with respect to the polarizer a. The first waveplate group P2 has 3 waveplates c1, c2 and c3 with a quarter phase retardation which are successively attached to an optical surface of the lens L12 away from the human eye, and has 3 waveplates d1, d2 and d3 with a half phase retardation for polarized light which are successively attached to an optical surface of the lens L21 close to the human eye side. The optical surface of L12 away from the human eye side and the optical surface of the lens L21 close to the human eye side sandwich and glue the first waveplate group (P2) to one component by attaching the first optics group (A1) and the second optics group (A2), with respect to the polarizer a, polarizing angles θc1, θc2 and θc3 of the waveplates c1, c2 and c3 are 95.8°, 100.8° and 99.1° respectively, and polarizing angles θd1, θd2 and θd3 of the waveplates d1, d2 and d3 are 6.9°, 34.5° and 35.1° respectively. The second waveplate group P4 has 1 waveplate e1 with a quarter phase retardation which is attached to an optical surface of the lens L31 away from the human eye side, and has 1 waveplate f1 with a half phase retardation for polarized light which is attached to the waveplate e1, with respect to the polarizer a, a polarizing angle θe1 of the waveplate e1 is 100.4°, and a polarizing angle θf1 of the waveplate f1 is 6.8°. The second polarizer group P5 has 1 polarizer g1 in which light of one polarization state is absorbed and light of the other polarization state transmits and which is attached to a miniature display (IMG), with a polarizing angle θg1 of the polarizer g1 being 1° with respect to the polarizer a, and has 1 waveplate h1 with a half phase retardation for polarized light, with a polarizing angle θh1 of the polarizer h1 being −1.1° with respect to the polarizer a. The optical surface of L32 away from the human eye side and the miniature display (IMG) sandwich and glue the second waveplate group (P4) and the second polarizer group (P5) to one component through attaching process. And the material of the first lens L11 of the eyepiece optical assembly is H-K9L, the material of the second lens L12 is H-ZF88, the material of the lens L21 of the second lens group is APL5514, and the materials of the lenses L31 and L32 of the third lens group are APL5514 and E48R respectively, the optical focal length F of the optical system is 17.51, and a total design mass of the lenses is 12.15 g, a length D from the first optical surface to the miniature display is 19.96, and a combined optical focal length F12 of the first optics group (A1) and the second optics group (A2) is 20.64. A combined center thickness D1 of the first optics group (A1) and the second optics group (A2) is 12.07, an optical focal length F3 of the third optics group (A3) is 33.01, a center thickness D2 of the third optics group (A3) is 6.64, an optical focal length f1 of the first lens group (L1) is 229.7, an optical focal length f2 of the second lens group (L2) is 115.62, and an optical focal length f3 of the third lens group (L3) is 33.01. A curvature radius R6 of the sixth optical surface 6 in the second optics group (A2) is −66.47, and a curvature radius R7 of the seventh optical surface 7 of the third optics group (A3) close to the human eye is 13.11, that is, D1/D is 0.61, D2/D is 0.33, D1/D2 is 0.39, F12/F is 1.18, F3/F is 1.89, F12/F3 is 0.63, f1/f2 is 1.99, f3/f2 is 0.29, f1/f3 is 6.96, and R6/R7 is −5.07.

FIGS. 10, 11, 12a and 12b are respectively a plot of the optical modulation transfer function MTF, a schematic diagram of dispersion spots, field curvature and distortion diagrams of the eyepiece optical assembly according to Example 3 of the present invention, showing with a large field of view, a resolution value in the schematic diagram of the modulation transfer function MTF at 101p is greater than 0.9, and from the data above, it can be seen that compared to Examples 1 and 2, changing the number of lenses and focal length of each lens group in conjunction with reasonable polarization control can produce higher imaging quality, small field curvature and optical distortion.

Example 4

TABLE 4

| Surface | Curvature radius | Thickness | Glass Refractive index | Abbe number | Net aperture | Cone co-efficient |
|---|---|---|---|---|---|---|
| Human eye | Infinite | 13 | — | — | 4 | — |
| 1 | 101.69 | 2.50 | 1.52 | 64.21 | 30 | — |
| 2 | Infinite | 1.89 | — | — | 30 | — |
| 3 | −236.29 | 1.43 | 1.95 | 17.94 | 30 | −57.64 |
| 4 | Infinite | 0.50 | 1.53 | 55.80 | 30 | — |
| 5 | Infinite | 2.34 | 1.54 | 56.11 | 30 | — |
| 9 | −112.57 | 0.30 | — | — | 30 | −26.51 |
| 10 | 489.30 | 4.05 | 1.54 | 56.11 | 30 | — |
| 6 | −68.43 | 0.00 | MIRROR | | 30 | 0.44 |
| 6 | −68.43 | −4.05 | 1.54 | 56.11 | 30 | 0.44 |
| 10 | 489.30 | −0.30 | — | — | 30 | — |
| 9 | −112.57 | −2.34 | 1.54 | 56.11 | 30 | −26.51 |
| 5 | Infinite | −0.50 | 1.53 | 55.80 | 30 | — |
| 4 | Infinite | −1.43 | 1.95 | 17.94 | 30 | — |
| 3 | −236.29 | −1.89 | — | — | 30 | −57.64 |
| 2 | Infinite | 1.89 | MIRROR | | 30 | — |
| 3 | −236.29 | 1.43 | 1.95 | 17.94 | 30 | −57.64 |
| 4 | Infinite | 0.50 | 1.53 | 55.80 | 30 | — |
| 5 | Infinite | 2.34 | 1.54 | 56.11 | 30 | — |
| 9 | −112.57 | 0.30 | — | — | 30 | −26.51 |
| 10 | 489.30 | 4.05 | 1.54 | 56.11 | 30 | — |
| 6 | −68.43 | 0.29 | — | — | 30 | 0.44 |
| 7 | 11.16 | 3.66 | 1.54 | 56.11 | 20.91 | −3.78 |
| 8 | Infinite | 0.5 | 1.53 | 55.80 | 19.94 | — |
| Screen surface | Infinite | 0.7 | 1.52 | 64.21 | 19.69 | — |
| Image plane | Infinite | — | — | — | 18.37 | — |

Figure 13:
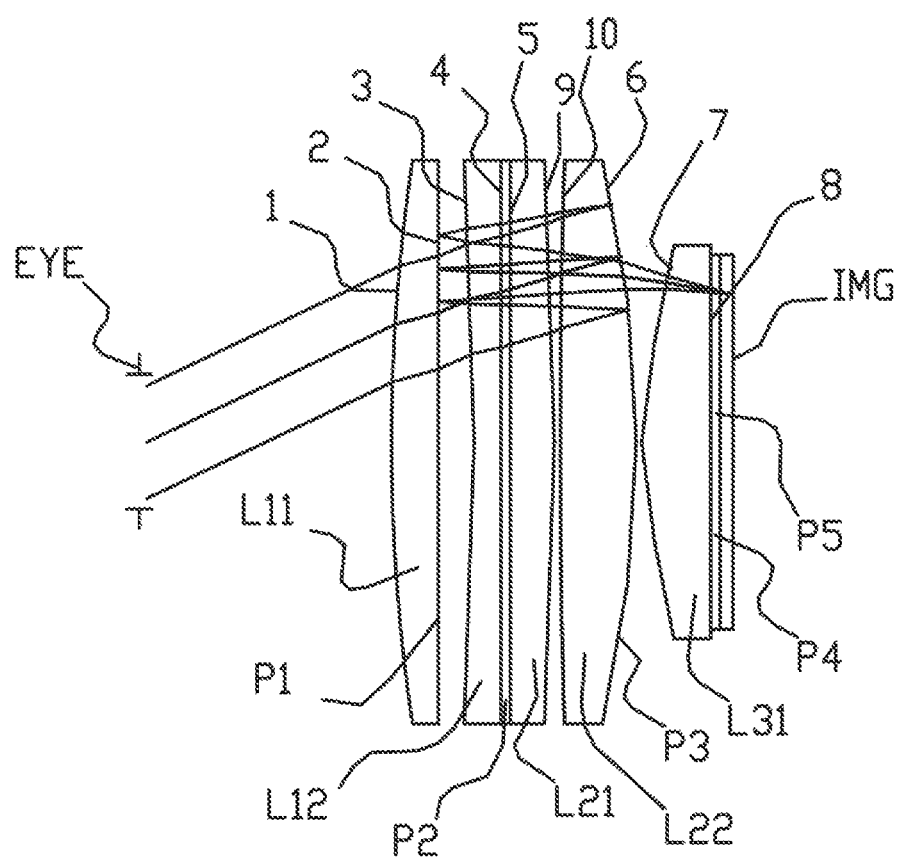
FIG. 13 is a schematic structural diagram of an eyepiece optical assembly according to Example 4 of the present invention.
Figure 14:
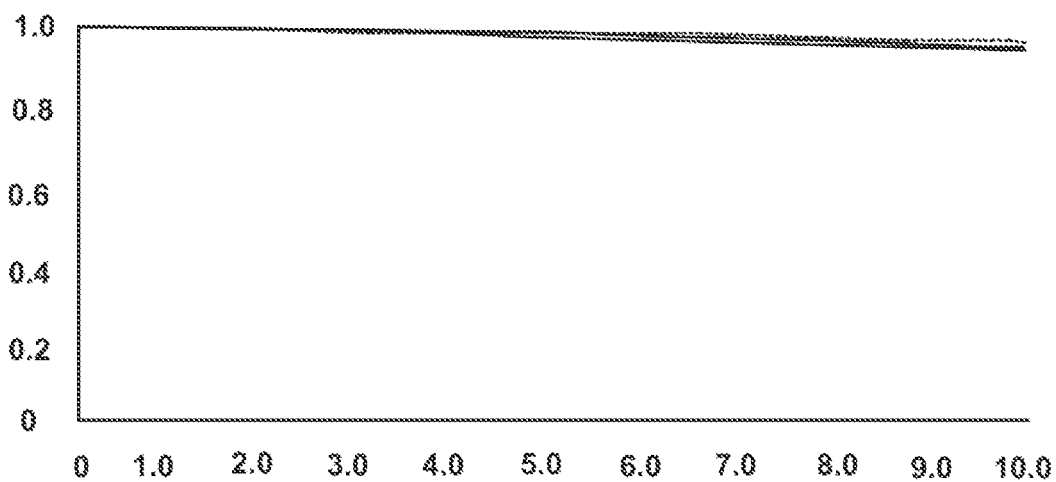
FIG. 14 is a schematic diagram of an optical modulation transfer function MTF of the eyepiece optical assembly according to Example 4 of the present invention.
Figure 15:
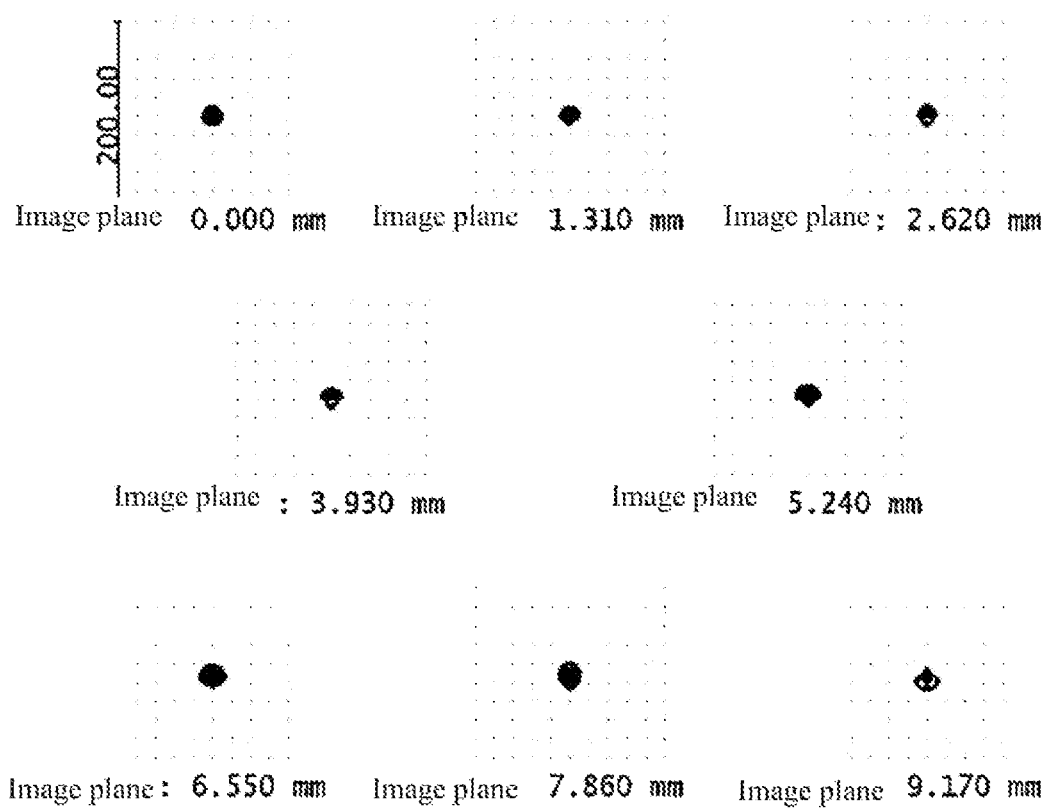
FIG. 15 is a schematic diagram of dispersion spots of the eyepiece optical assembly according to Example 4 of the present invention.
Figure 16A:
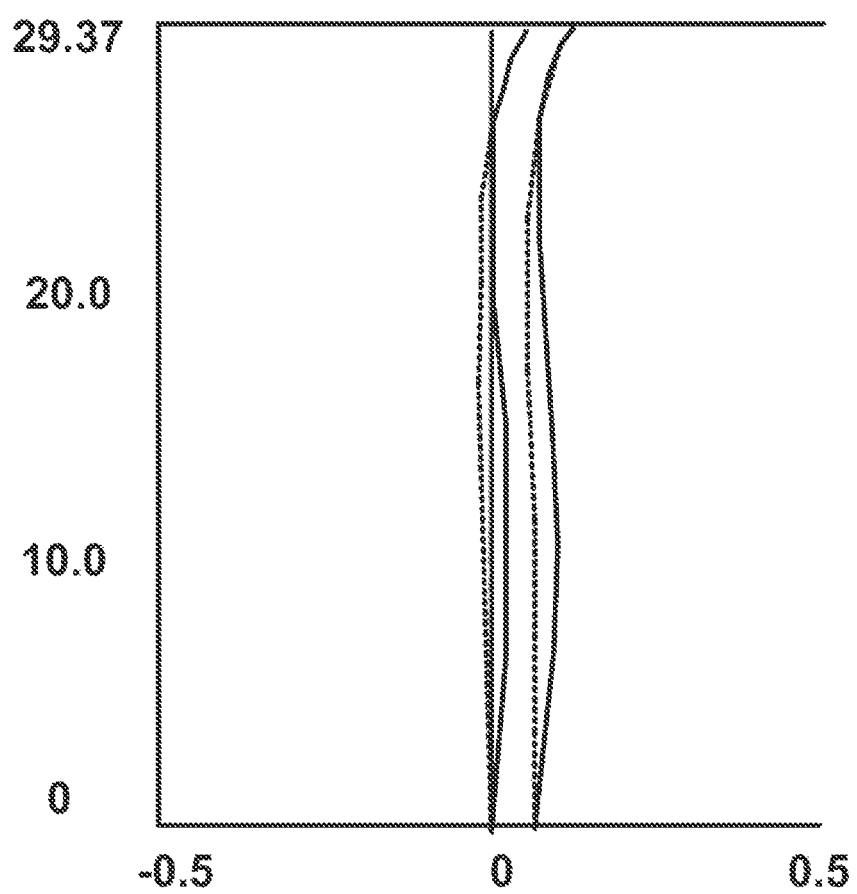
FIGS. 16a and 16b are schematic diagrams of field curvature and distortion of the eyepiece optical assembly according to Example 4 of the present invention.
Figure 16B:
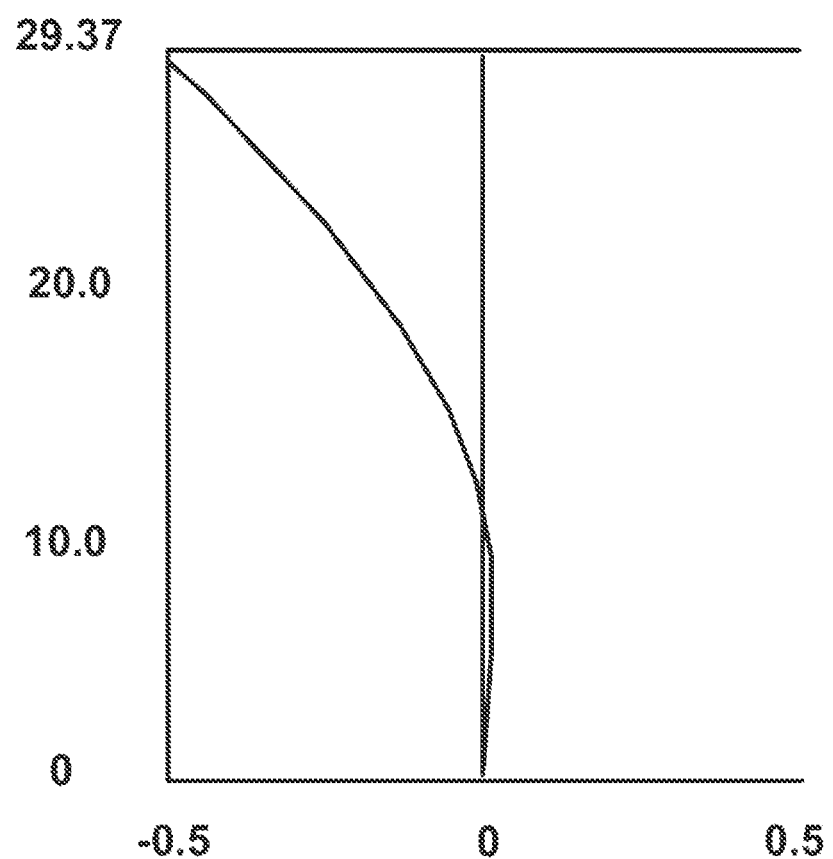

FIG. 13 is a schematic structural diagram of an optical path of an eyepiece optical assembly according to Example 4, as shown, from a human eye viewing side to a miniature image display side (from left to right), including successively a human eye EYE, a first lens L11, a first polarizer group P1, a second lens L12, a first waveplate group P2, lenses L21 and L22 of a second lens group, a transflective reflection surface P3, a lens L31 of a third lens group, a second waveplate group P4 and a second polarizer group P5, wherein the first polarizer group P1 has 1 polarizer b1 in which light of one polarization state is absorbed and light of the other polarization state transmits and which is attached to an optical surface of the lens L11 away from the human eye, and has 1 polarizer a in which light of one polarization state is reflected and light of the other polarization state transmits and which is attached to the polarizer b1, and a polarizing angle θb1 of the polarizer b1 is −0.5° with respect to the polarizer a. The first waveplate group P2 has 1 waveplate c1 with a quarter phase retardation which is attached to an optical surface of the lens L12 away from the human eye side, and has 2 waveplates d1 and d2 with a half phase retardation for polarized light which are successively attached to an optical surface of the lens L21 close to the human eye side. The optical surface of L12 away from the human eye side and the optical surface of the lens L21 close to the human eye side sandwich and glue the waveplate group (P2) to one component by attaching the first optics group (A1) and the second optics group (A2), with respect to the polarizer a, a polarizing angle θc1 of the waveplate c1 is 100.8°, and polarizing angles θd1 and θd2 of the waveplates d1 and d2 are 7.1° and 34.5° respectively. The second waveplate group P4 has 1 waveplate e1 with a quarter phase retardation which is attached to an optical surface of the lens L31 away from the human eye side, and has 1 waveplate f1 with a half phase retardation for polarized light which is attached to the waveplate e1, with respect to the polarizer a, a polarizing angle θe1 of the waveplate e1 is 100.4°, and a polarizing angle θf1 of the waveplate f1 is 7°. The second polarizer group P5 has 1 polarizer g1 in which light of one polarization state is absorbed and light of the other polarization state transmits and which is attached to a miniature display (IMG), with a polarizing angle θg1 of the polarizer g1 being −0.5° with respect to the polarizer a, and has 1 waveplate h1 with a half phase retardation for polarized light, with a polarizing angle θh1 of the polarizer h1 being −1.3° with respect to the polarizer a. The optical surface of L31 away from the human eye side and the miniature display (IMG) sandwich and glue the second waveplate group (P4) and the second polarizer group (P5) to one component through attaching process. And the material of the first lens L11 of the eyepiece optical assembly is H-K9L, the material of the second lens L12 is H-ZF88, the material of the lenses L21 and L22 of the second lens group is APL5514, and the materials of the lens L31 of the third lens group are APL5514, the optical focal length F of the optical system is 17.17, and a total design mass of the lenses is 13.24 g, a length D from the first optical surface to the miniature display is 18.16, and a combined optical focal length F12 of the first optics group (A1) and the second optics group (A2) is 18.94. A combined center thickness D1 of the first optics group (A1) and the second optics group (A2) is 13.3, an optical focal length F3 of the third optics group (A3) is 33.94, a center thickness D2 of the third optics group (A3) is 3.66, an optical focal length f1 of the first lens group (L1) is 2712.33, an optical focal length f2 of the second lens group (L2) is 81.66, and an optical focal length f3 of the third lens group (L3) is 33.97. A curvature radius R6 of the sixth optical surface 6 in the second optics group (A2) is −68.43, and a curvature radius R7 of the seventh optical surface 7 of the third optics group (A3) close to the human eye is 11.16, that is, D1/D is 0.73, D2/D is 0.20, D1/D2 is 0.28, F12/F is 1.10, F3/F is 1.98, F12/F3 is 0.56, f1/f2 is 33.21, f3/f2 is 0.42, f1/f3 is 79.84, and R6/R7 is −6.13.

FIGS. 14, 15, 16a and 16b are respectively a plot of the optical modulation transfer function MTF, a schematic diagram of dispersion spots, field curvature and distortion diagrams of the eyepiece optical assembly according to Example 4 of the present invention, showing with a large field of view, a resolution value in the schematic diagram of the modulation transfer function MTF at 101p is greater than 0.92, and from the data above, it can be seen that compared to Examples above, changing the number of lenses and focal length of each lens group in conjunction with reasonable polarization control can produce higher imaging quality, small field curvature and optical distortion, but it is slightly inferior in terms of total mass.

Example 5

TABLE 5

| Surface | Curvature radius | Thickness | Glass | | Cone | |
| | | | Refractive index | Abbe number | Net aperture | co-efficient |
|---|---|---|---|---|---|---|
| Human eye | Infinite | 13 | — | — | 4 | — |
| 1 | 11.60 | 2.55 | 1.53 | 55.80 | 25.86 | −1.80 |
| 2 | Infinite | 1.43 | — | — | 26.92 | — |
| 3 | 32.56 | 0.83 | 1.64 | 22.41 | 27.51 | −3.19 |
| 4 | Infinite | 0.50 | 1.53 | 55.80 | 28.81 | — |
| 5 | Infinite | 4.20 | 1.54 | 56.11 | 29.21 | — |
| 6 | 15.52 | 0.00 | MIRROR | | 30.98 | −1.00 |
| 6 | 15.52 | −4.20 | 1.54 | 56.11 | 30.98 | −1.00 |
| 5 | Infinite | −0.50 | 1.53 | 55.80 | 30.30 | — |
| 4 | Infinite | −0.83 | 1.64 | 22.41 | 30.14 | — |
| 3 | 32.56 | −1.43 | — | — | 29.61 | −3.19 |
| 2 | Infinite | 1.43 | MIRROR | | 29.46 | — |
| 3 | 32.56 | 0.83 | 1.64 | 22.41 | 29.31 | −3.19 |
| 4 | Infinite | 0.50 | 1.53 | 55.80 | 29.06 | — |
| 5 | Infinite | 4.20 | 1.54 | 56.11 | 28.98 | — |
| 6 | 15.52 | 0.33 | — | — | 30.98 | −1.00 |
| 7 | 12.80 | 8.80 | 1.70 | 56.20 | 24.63 | −1.19 |
| 8 | Infinite | 0.50 | 1.53 | 55.80 | 21.81 | — |
| 8 | Infinite | 0.99 | — | — | 21.31 | — |
| Screen surface | Infinite | 0.7 | 1.52 | 64.21 | 19.69 | — |
| Image plane | Infinite | — | — | — | 18.37 | — |

Figure 17:
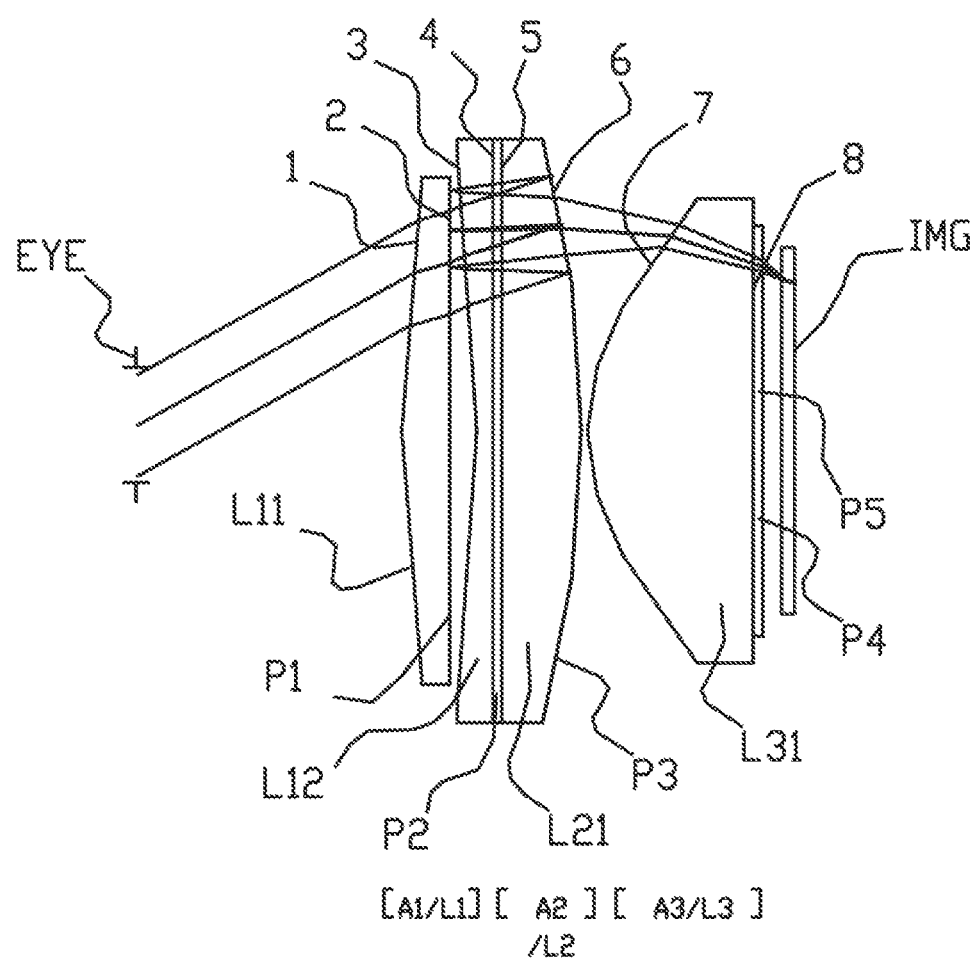
FIG. 17 is a schematic structural diagram of an eyepiece optical assembly according to Example 5 of the present invention.
Figure 18:
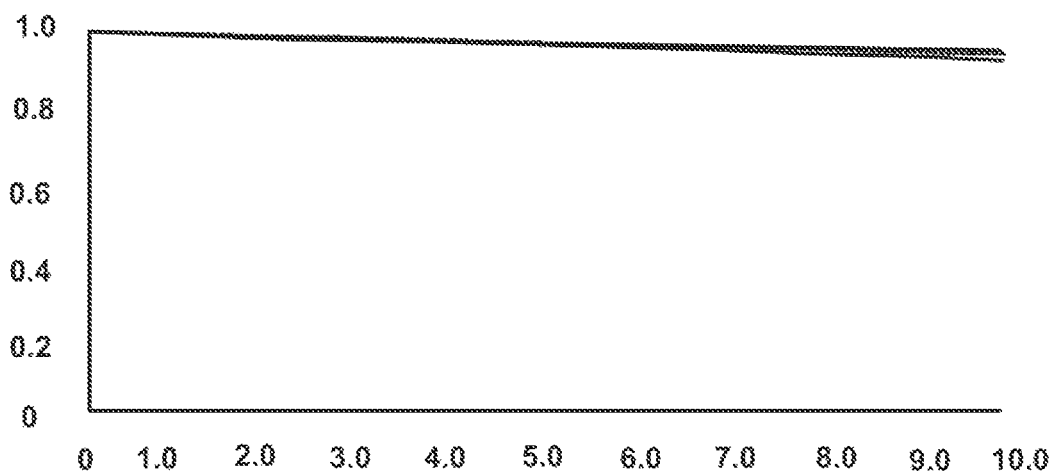
FIG. 18 is a schematic diagram of an optical modulation transfer function MTF of the eyepiece optical assembly according to Example 5 of the present invention.
Figure 19:
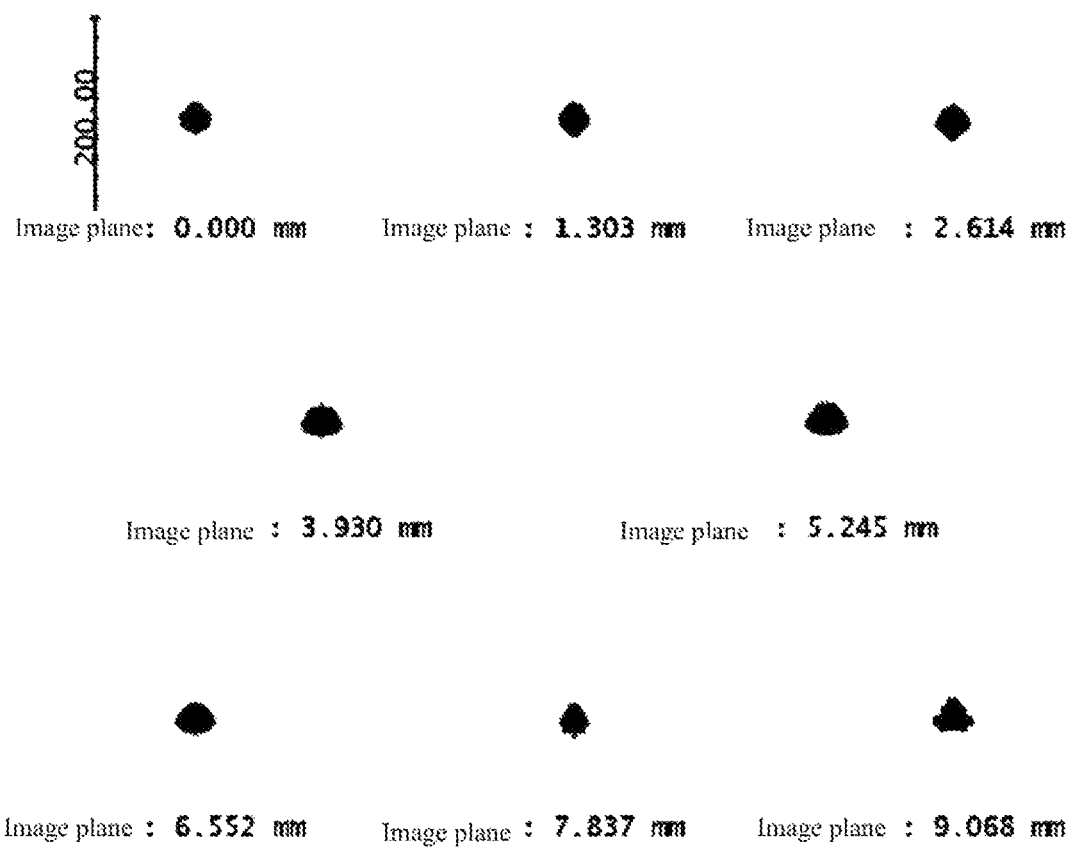
FIG. 19 is a schematic diagram of dispersion spots of the eyepiece optical assembly according to Example 5 of the present invention.
Figure 20A:
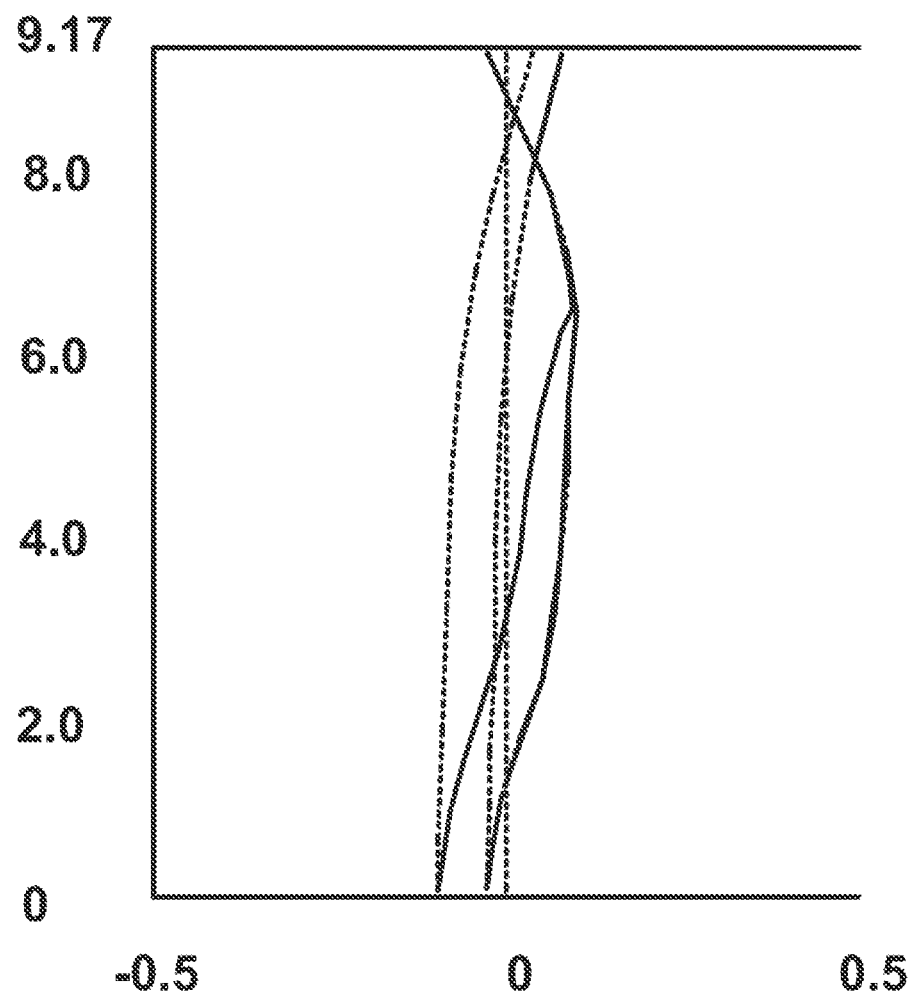
FIGS. 20a and 20b are schematic diagrams of field curvature and distortion of the eyepiece optical assembly according to Example 5 of the present invention.
Figure 20B:
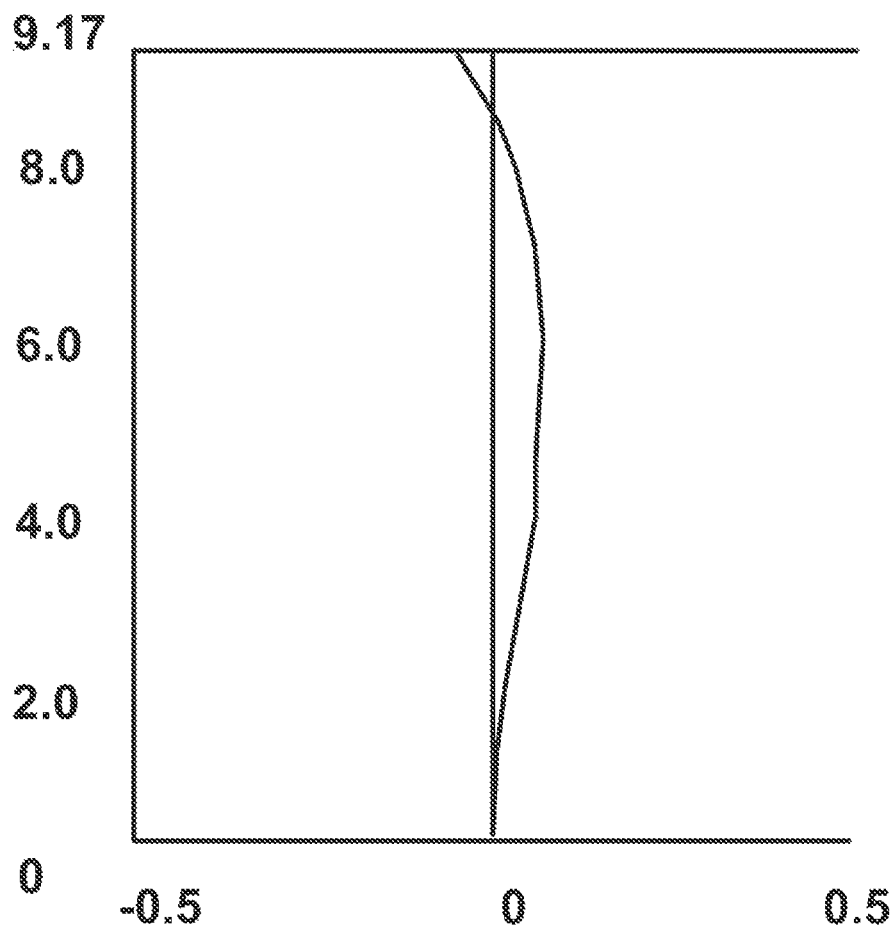

FIG. 17 is a schematic structural diagram of an optical path of an eyepiece optical assembly according to Example 5, as shown, from a human eye viewing side to a miniature image display side (from left to right), including successively a human eye EYE, a first lens L11, a first polarizer group P1, a second lens L12, a first waveplate group P2, a lens L21 of a second lens group, a transflective reflection surface P3, a lens L31 of a third lens group, a second waveplate group P4 and a second polarizer group P5, wherein the first polarizer group P1 has 1 polarizer b1 in which light of one polarization state is absorbed and light of the other polarization state transmits and which is attached to an optical surface of the lens L11 away from the human eye, and has 1 polarizer a in which light of one polarization state is reflected and light of the other polarization state transmits and which is attached to the polarizer b1, and a polarizing angle θb1 of the polarizer b1 is −0.5° with respect to the polarizer a. The first waveplate group P2 has 1 waveplate c 1 with a quarter phase retardation which is attached to an optical surface of the lens L12 away from the human eye, and has 2 waveplates d1 and d2 with a half phase retardation for polarized light which are successively attached to an optical surface of the lens L21 close to the human eye side. The optical surface of L12 away from the human eye side and the optical surface of the lens L21 close to the human eye side sandwich and glue the waveplate group (P2) to one component by attaching the first optics group (A1) and the second optics group (A2), with respect to the polarizer a, a polarizing angle θc1 of the waveplate c1 is 100.8°, and polarizing angles θd1 and θd2 of the waveplates d1 and d2 are 7.1° and 34.5° respectively. The second waveplate group P4 has 1 waveplate e1 with a quarter phase retardation which is attached to an optical surface of the lens L31 away from the human eye side, and has 1 waveplate f1 with a half phase retardation for polarized light which is attached to the waveplate e1, with respect to the polarizer a, a polarizing angle θe1 of the waveplate e1 is 100.4°, and a polarizing angle θf1 of the waveplate f1 is 7°. The second polarizer group P5 has 1 polarizer g1 in which light of one polarization state is absorbed and light of the other polarization state transmits and which is attached to a miniature display (IMG), with a polarizing angle θg1 of the polarizer g1 being −0.5° with respect to the polarizer a, and has 1 waveplate h1 with a half phase retardation for polarized light which is attached to the optical surface of the lens L31 away from the human eye side, with a polarizing angle θh1 of the polarizer h1 being −1.3° with respect to the polarizer a. And the material of the first lens L11 of the eyepiece optical assembly is K26R, the material of the second lens L12 is OKP1, the material of the lens L21 of the second lens group is APL5514, and the material of the lens L31 of the third lens group is H-LAK12, the optical focal length F of the optical system is 14.01, and a total design mass of the lenses is 15.75 g, a length D from the first optical surface to the miniature display is 20.83, and a combined optical focal length F12 of the first optics group (A1) and the second optics group (A2) is 25.27. A combined center thickness D1 of the first optics group (A1) and the second optics group (A2) is 9.84, an optical focal length F3 of the third optics group (A3) is 15.9, a center thickness D2 of the third optics group (A3) is 10.99, an optical focal length f1 of the first lens group (L1) is 219.51, an optical focal length f2 of the second lens group (L2) is 118.45, and an optical focal length f3 of the third lens group (L3) is 15.9. A curvature radius R6 of the sixth optical surface 6 in the second optics group (A2) is 15.52, and a curvature radius R7 of the seventh optical surface 7 of the third optics group (A3) close to the human eye is 12.79, that is, D1/D is 0.47, D2/D is 0.53, D1/D2 is 1.12, F12/F is 1.80, F3/F is 1.13, F12/F3 is 1.59, f1/f2 is 1.85, f3/f2 is 0.13, f1/f3 is 13.81, and R6/R7 is 1.21.

FIGS. 18, 19, 20a and 20b are respectively a plot of the optical modulation transfer function MTF, a schematic diagram of dispersion spots, field curvature and distortion diagrams of the eyepiece optical assembly according to Example 5 of the present invention, showing with a large field of view, a resolution value in the schematic diagram of the modulation transfer function MTF at 101p is greater than 0.92, and from the data above, it can be seen that compared to Example 4, changing the material of lenses and focal length of each lens group in conjunction with reasonable polarization control can produce higher imaging quality, small field curvature and optical distortion, but it is slightly inferior in terms of total mass.

Example 6

TABLE 6

| Surface | Curvature radius | Thickness | Glass Refractive index | Abbe number | Net aperture | Cone coefficient |
|---|---|---|---|---|---|---|
| Human eye | Infinite | 13 | — | — | 6 | — |
| 1 | 32.05 | 4.61 | 1.53 | 55.80 | 21.67 | −23.77 |
| 2 | Infinite | 2.19 | — | — | 23.34 | — |
| 3 | 109.82 | 1.21 | 1.64 | 22.41 | 24.48 | 29.74 |
| 4 | Infinite | 0.15 | 1.53 | 55.80 | 25.59 | — |
| 5 | Infinite | 3.46 | 1.53 | 56.18 | 25.68 | — |
| 6 | 14.16 | 0.00 | MIRROR | | 27.06 | −0.70 |
| 6 | 14.16 | −3.46 | 1.53 | 56.18 | 27.06 | −0.70 |
| 5 | Infinite | −0.15 | 1.53 | 55.80 | 26.80 | — |
| 4 | Infinite | −1.21 | 1.64 | 22.41 | 26.79 | — |
| 3 | 109.82 | −2.19 | — | — | 26.56 | 29.74 |

TABLE 6-continued

| Surface | Curvature radius | Thickness | Glass Refractive index | Abbe number | Net aperture | Cone coefficient |
|---|---|---|---|---|---|---|
| 2 | Infinite | 2.19 | MIRROR | | 26.53 | — |
| 3 | 109.82 | 1.21 | 1.64 | 22.41 | 26.51 | 29.74 |
| 4 | Infinite | 0.15 | 1.53 | 55.80 | 26.67 | — |
| 5 | Infinite | 3.46 | 1.53 | 56.18 | 26.68 | — |
| 6 | 14.16 | 0.41 | — | — | 26.88 | −0.70 |
| 7 | 8.54 | 7.92 | 1.54 | 56.11 | 26.51 | −0.78 |
| 8 | Infinite | 0.20 | 1.53 | 55.80 | 25.19 | — |
| 8 | Infinite | 3.09 | — | — | 25.09 | — |
| Screen surface | Infinite | 1.13 | 1.52 | 64.21 | 22.64 | — |
| Image plane | Infinite | — | — | — | 21.48 | — |

Figure 21:
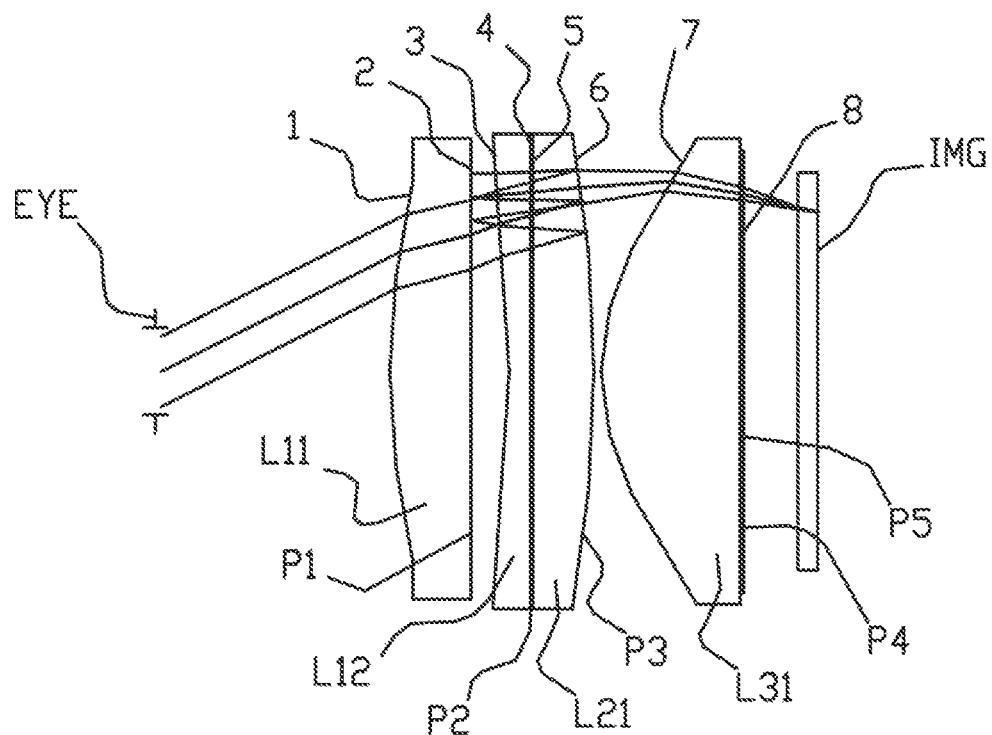
FIG. 21 is a schematic structural diagram of an eyepiece optical assembly according to Example 6 of the present invention.
Figure 22:
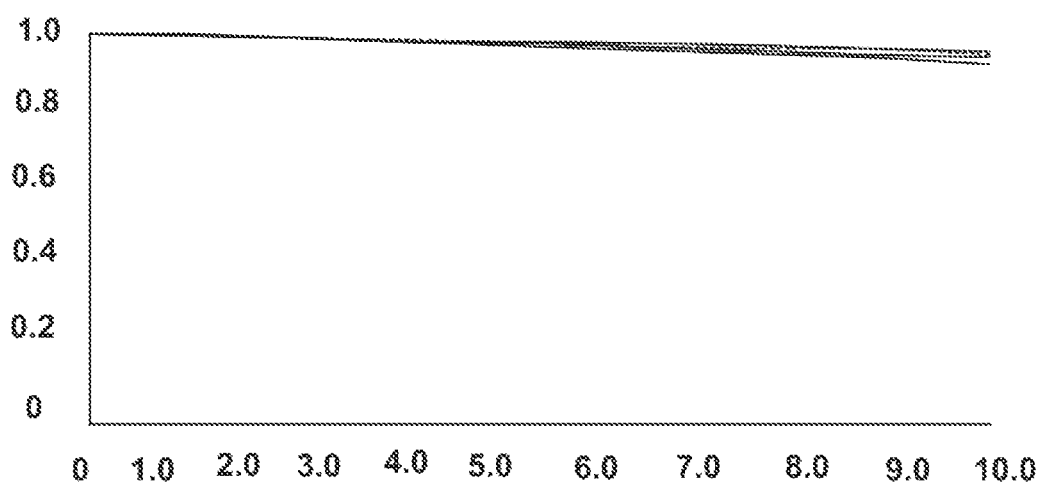
FIG. 22 is a schematic diagram of an optical modulation transfer function MTF of the eyepiece optical assembly according to Example 6 of the present invention.
Figure 23:
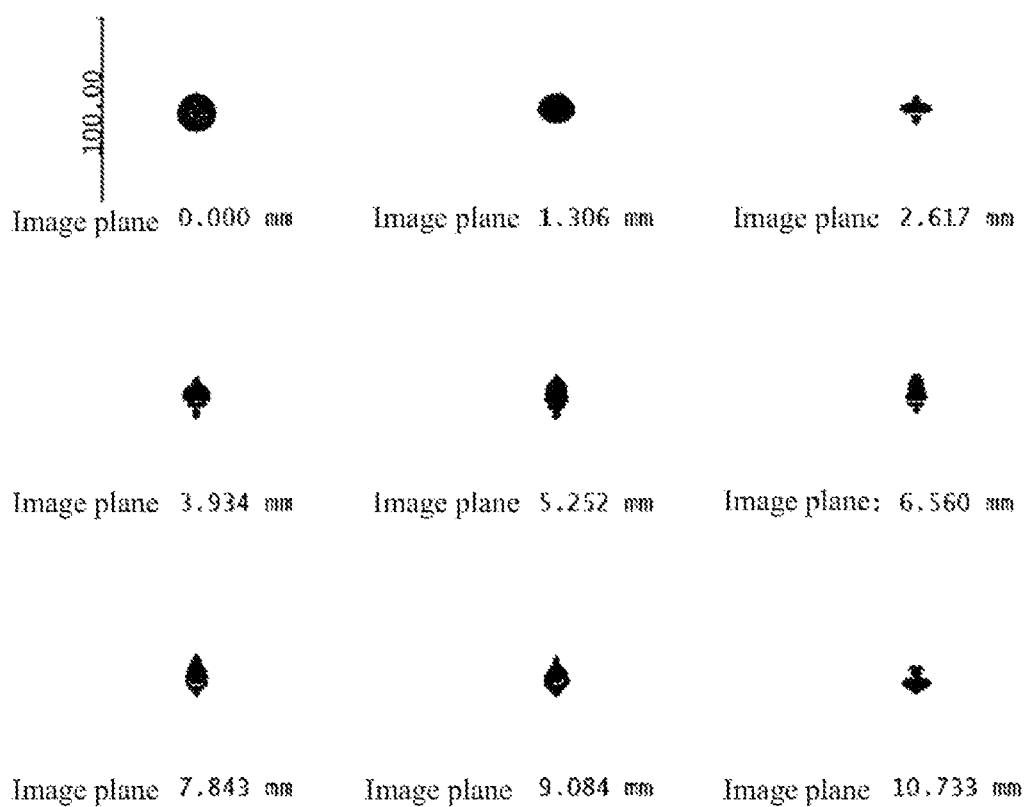
FIG. 23 is a schematic diagram of dispersion spots of the eyepiece optical assembly according to Example 6 of the present invention.
Figure 24A:
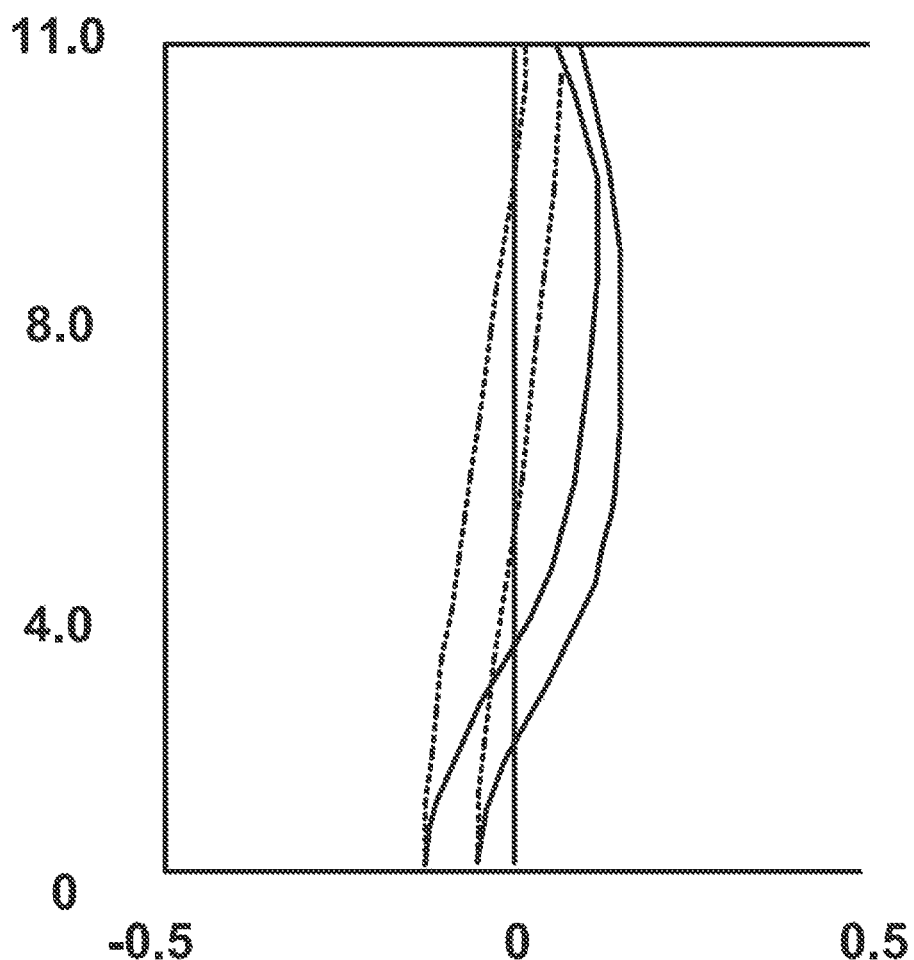
FIGS. 24a and 24b are schematic diagrams of field curvature and distortion of the eyepiece optical assembly according to Example 6 of the present invention.
Figure 24B:
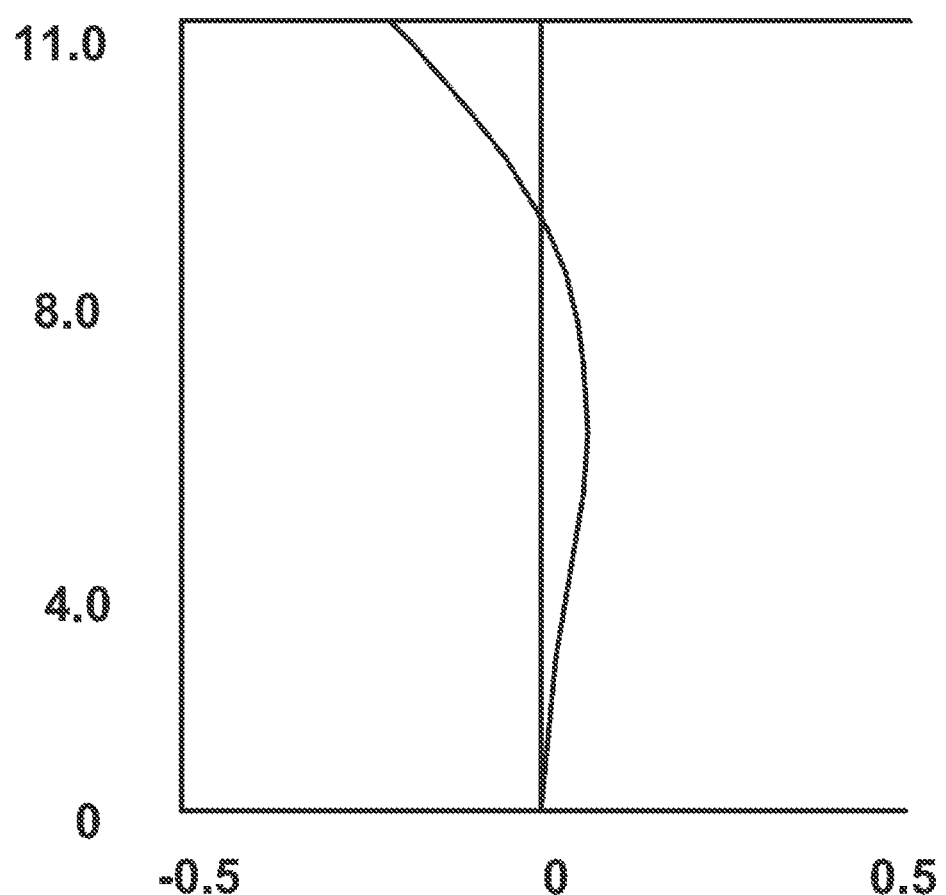

FIG. 21 is a schematic structural diagram of an optical path of an eyepiece optical assembly according to Example 6, as shown, from a human eye viewing side to a miniature image display side (from left to right), including successively a human eye EYE, a first lens L11, a first polarizer group P1, a second lens L12, a first waveplate group P2, a lens L21 of a second lens group, a transflective reflection surface P3, a lens L31 of a third lens group, a second waveplate group P4 and a second polarizer group P5, wherein the first polarizer group P1 has 1 polarizer b1 in which light of one polarization state is absorbed and light of the other polarization state transmits and which is attached to an optical surface of the lens L11 away from the human eye, and has 1 polarizer a in which light of one polarization state is reflected and light of the other polarization state transmits and which is attached to the polarizer b1, and a polarizing angle θb1 of the polarizer b1 is −0.5° with respect to the polarizer a. The first waveplate group P2 has 1 waveplate c1 with a quarter phase retardation which is attached to an optical surface of the lens L12 away from the human eye side, and has 2 waveplates d1 and d2 with a half phase retardation for polarized light which are successively attached to an optical surface of the lens L21 close to the human eye side. The optical surface of L12 away from the human eye side and the optical surface of the lens L21 close to the human eye side sandwich and glue the waveplate group (P2) to one component by attaching the first optics group (A1) and the second optics group (A2), with respect to the polarizer a, a polarizing angle θc1 of the waveplate c1 is 100.8°, and polarizing angles θd1 and θd2 of the waveplates d1 and d2 are 7.1° and 34.5° respectively. The second waveplate group P4 has 1 waveplate e1 with a quarter phase retardation which is attached to an optical surface of the lens L31 away from the human eye side, and has 1 waveplate f1 with a half phase retardation for polarized light which is attached to the waveplate e1, with respect to the polarizer a, a polarizing angle θe1 of the waveplate e1 is 100.4°, and a polarizing angle θf1 of the waveplate f1 is 7°. The second polarizer group P5 has 1 polarizer g1 in which light of one polarization state is absorbed and light of the other polarization state transmits and which is attached to a miniature display (IMG), with a polarizing angle θg1 of the polarizer g1 being −0.5° with respect to the polarizer a, and has 1 waveplate h1 with a half phase retardation for polarized light which is attached to the optical surface of the lens L31 away from the human eye side, with a polarizing angle θh1 of the polarizer h1 being −1.3° with respect to the polarizer a. And the material of the first lens L11 of the eyepiece optical assembly is K26R, the material of the second lens L12 is OKP1, the material of the lens L21 of the second lens group is TOPAS, and the material of the lens L31 of the third lens group is APL5514, the optical focal length F of the optical system is 18.08, and a total design mass of the lenses is 8.42 g, a length D from the first optical surface to the miniature display is 24.38, and a combined optical focal length F12 of the first optics group (A1) and the second optics group (A2) is 29.96. A combined center thickness D1 of the first optics group (A1) and the second optics group (A2) is 12.03, an optical focal length F3 of the third optics group (A3) is 23.52, a center thickness D2 of the third optics group (A3) is 12.35, an optical focal length f1 of the first lens group (L1) is 164.03, an optical focal length f2 of the second lens group (L2) is 144.15, and an optical focal length f3 of the third lens group (L3) is 23.52. A curvature radius R6 of the sixth optical surface 6 in the second optics group (A2) is 14.16, and a curvature radius R7 of the seventh optical surface 7 of the third optics group (A3) close to the human eye is 8.54, that is, D1/D is 0.49, D2/D is 0.51, D1/D2 is 1.03, F12/F is 1.66, F3/F is 1.30, F12/F3 is 1.27, f1/f2 is 1.14, f3/f2 is 0.16, f1/f3 is 6.97, and R6/R7 is 1.66.

FIGS. 22, 23, 24a and 24b are respectively a plot of the optical modulation transfer function MTF, a schematic diagram of dispersion spots, field curvature and distortion diagrams of the eyepiece optical assembly according to Example 6 of the present invention, showing with a large field of view, a resolution value in the schematic diagram of the modulation transfer function MTF at 101p is greater than 0.9, and from the data above, it can be seen that compared to Examples above, changing the material of lenses and focal length of each lens group in conjunction with reasonable polarization control can produce higher imaging quality, small field curvature and optical distortion, and it is slightly superior in terms of total mass.

Example 7

TABLE 7

| Surface | Curvature radius | Thickness | Glass Refractive index | Abbe number | Net aperture | Cone coefficient |
|---|---|---|---|---|---|---|
| Human eye | Infinite | 13 | — | — | 4 | — |
| 1 | 36.2 | 4.8 | 1.53 | 55.80 | 17.31 | −34.82 |
| 2 | Infinite | 2.26 | — | — | 18.92 | — |
| 3 | −71 | 1.2 | 1.64 | 22.41 | 20.02 | −81.75 |
| 4 | Infinite | 0.15 | 1.53 | 55.80 | 20.81 | — |
| 5 | Infinite | 3.4 | 1.53 | 55.80 | 20.89 | — |
| 6 | −76.82 | 0 | MIRROR | | 22.18 | −3.20 |
| 6 | −76.82 | −3.40 | 1.53 | 55.80 | 22.18 | −3.20 |
| 5 | Infinite | −0.15 | 1.53 | 55.80 | 21.95 | — |
| 4 | Infinite | −1.20 | 1.64 | 22.41 | 21.93 | — |
| 3 | −71 | −2.26 | — | — | 21.78 | −81.75 |
| 2 | Infinite | 2.26 | MIRROR | | 21.78 | — |
| 3 | −71 | 1.2 | 1.64 | 22.41 | 21.77 | −81.75 |
| 4 | Infinite | 0.15 | 1.53 | 55.80 | 21.91 | — |
| 5 | Infinite | 3.4 | 1.53 | 55.80 | 21.92 | — |
| 6 | −76.82 | 0.4 | — | — | 22.14 | −3.20 |
| 7 | 13.13 | 7.52 | 1.53 | 55.80 | 22.03 | −0.69 |
| 8 | Infinite | 0.2 | 1.53 | 55.80 | 20.43 | — |
| 8 | Infinite | 1.98 | — | — | 20.35 | — |
| Screen surface | Infinite | 0.9 | 1.52 | 64.21 | 19.06 | — |
| Image plane | Infinite | — | — | — | 18.09 | — |

Figure 25:
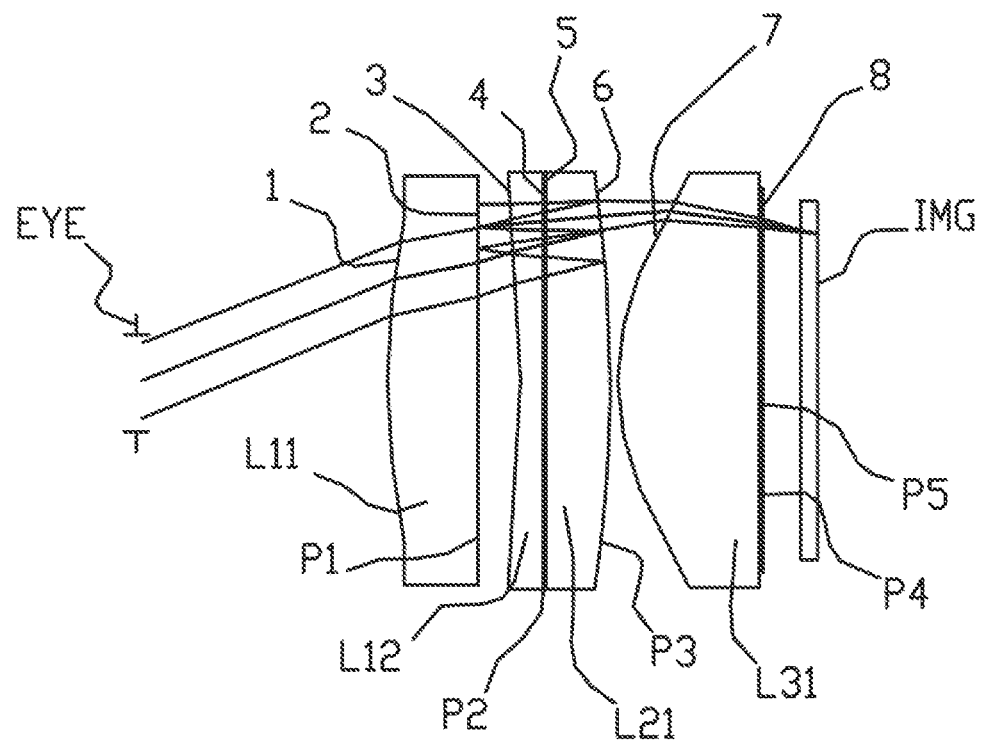
FIG. 25 is a schematic structural diagram of an eyepiece optical assembly according to Example 7 of the present invention.
Figure 26:
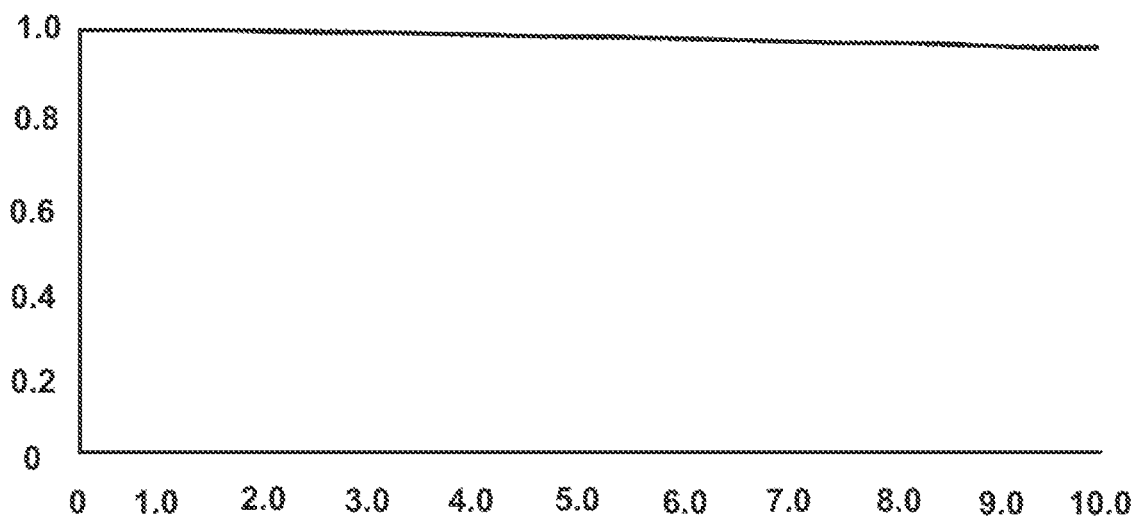
FIG. 26 is a schematic diagram of an optical modulation transfer function MTF of the eyepiece optical assembly according to Example 7 of the present invention.
Figure 27:
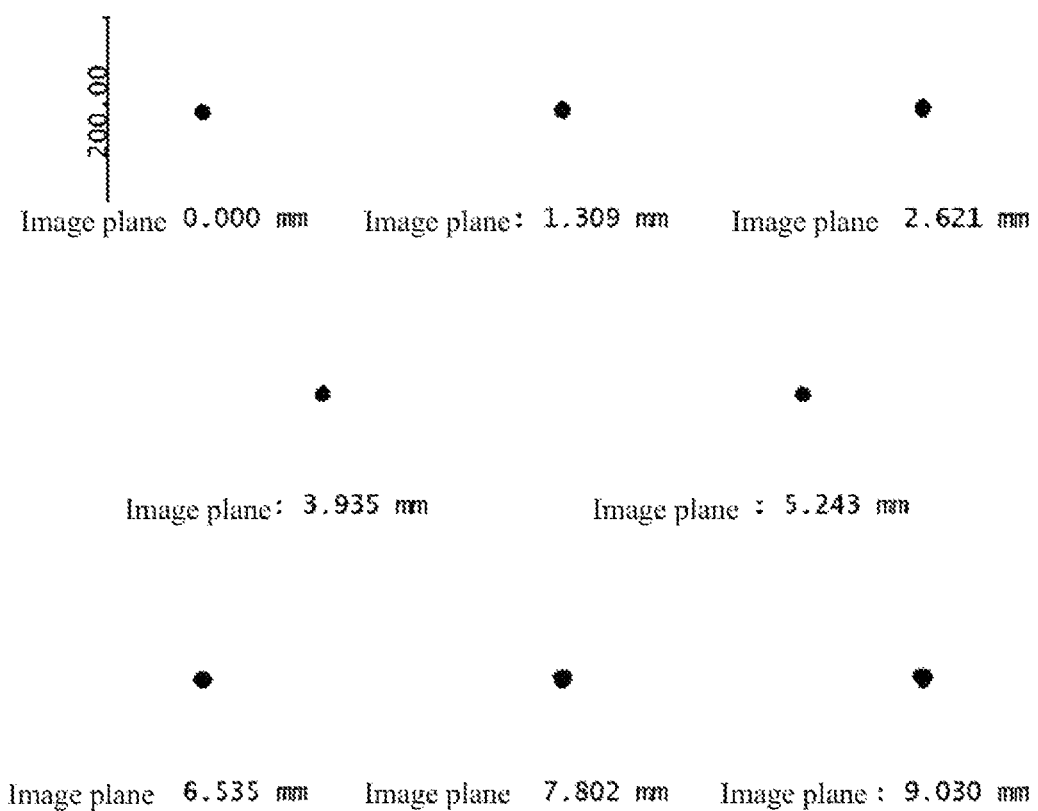
FIG. 27 is a schematic diagram of dispersion spots of the eyepiece optical assembly according to Example 7 of the present invention.
Figure 28A:
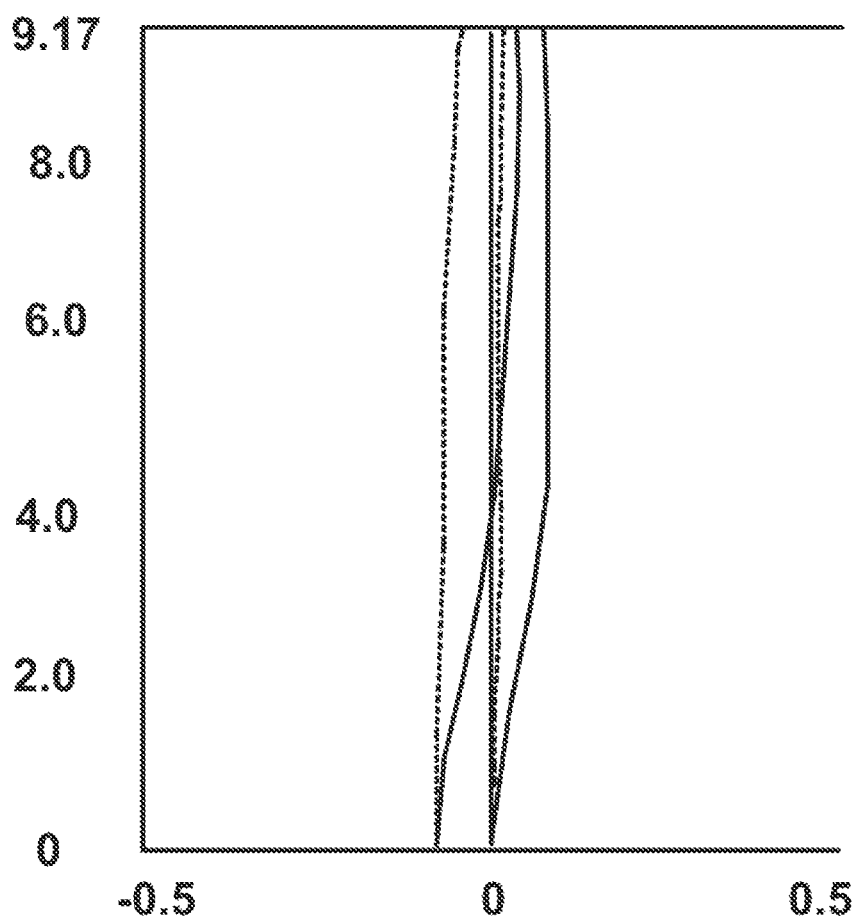
FIGS. 28a and 28b are schematic diagrams of field curvature and distortion of the eyepiece optical assembly according to Example 7 of the present invention.
Figure 28B:
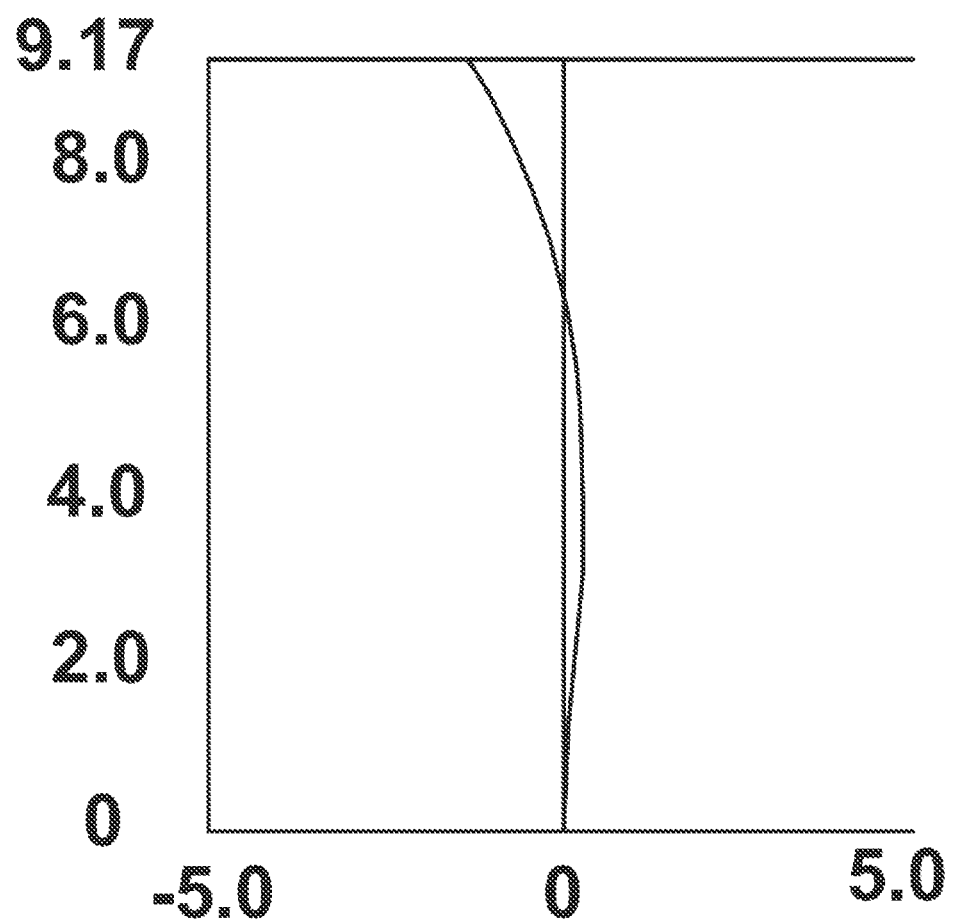

FIG. 25 is a schematic structural diagram of an optical path of an eyepiece optical assembly according to Example 7, as shown, from a human eye viewing side to a miniature image display side (from left to right), including successively a human eye EYE, a first lens L11, a first polarizer group P1, a second lens L12, a first waveplate group P2, a lens L21 of a second lens group, a transflective reflection surface P3, a lens L31 of a third lens group, a second waveplate group P4 and a second polarizer group P5, wherein the first polarizer group P1 has 1 polarizer b1 in which light of one polarization state is absorbed and light of the other polarization state transmits and which is attached to an optical surface of the lens L11 away from the human eye, and has 1 polarizer a in which light of one polarization state is reflected and light of the other polarization state transmits and which is attached to the polarizer b1, and a polarizing angle θb1 of the polarizer b1 is −0.5° with respect to the polarizer a. The first waveplate group P2 has 1 waveplate c1 with a quarter phase retardation which is attached to an optical surface of the lens L12 away from the human eye side, and has 2 waveplates d1 and d2 with a half phase retardation for polarized light which are successively attached to an optical surface of the lens L21 close to the human eye side. The optical surface of L12 away from the human eye side and the optical surface of the lens L21 close to the human eye side sandwich and glue the waveplate group (P2) to one component by attaching the first optics group (A1) and the second optics group (A2), with respect to the polarizer a, a polarizing angle θc1 of the waveplate c 1 is 100.8°, and polarizing angles θd1 and θd2 of the waveplates d1 and d2 are 7.1° and 34.5° respectively. The second waveplate group P4 has 1 waveplate e1 with a quarter phase retardation which is attached to an optical surface of the lens L31 away from the human eye side, and has 1 waveplate f1 with a half phase retardation for polarized light which is attached to the waveplate e1, with respect to the polarizer a, a polarizing angle θe1 of the waveplate e1 is 100.4°, and a polarizing angle θf1 of the waveplate f1 is 7°. The second polarizer group P5 has 1 polarizer g1 in which light of one polarization state is absorbed and light of the other polarization state transmits and which is attached to a miniature display (IMG), with a polarizing angle θg1 of the polarizer g1 being −0.5° with respect to the polarizer a, and has 1 waveplate h1 with a half phase retardation for polarized light which is attached to the optical surface of the lens L31 away from the human eye side, with a polarizing angle θh1 of the polarizer h1 being −1.3° with respect to the polarizer a. And the material of the first lens L11 of the eyepiece optical assembly is K26R, the material of the second lens L12 is OKP1, the material of the lens L21 of the second lens group is K26R, and the material of the lens L31 of the third lens group is K26R, the optical focal length F of the optical system is 18.45, and a total design mass of the lenses is 5.88 g, a length D from the first optical surface to the miniature display is 24.31, and a combined optical focal length F12 of the first optics group (A1) and the second optics group (A2) is 29.79. A combined center thickness D1 of the first optics group (A1) and the second optics group (A2) is 12.21, an optical focal length F3 of the third optics group (A3) is 24.55, a center thickness D2 of the third optics group (A3) is 12.1, an optical focal length f1 of the first lens group (L1) is 154.95, an optical focal length f2 of the second lens group (L2) is 143.59, and an optical focal length f3 of the third lens group (L3) is 24.55. A curvature radius R6 of the sixth optical surface 6 in the second optics group (A2) is 76.82, and a curvature radius R7 of the seventh optical surface 7 of the third optics group (A3) close to the human eye side is 13.132, that is, D1/D is 0.5, D2/D is 0.50, D1/D2 is 0.99, F12/F is 1.61, F3/F is 1.33, F12/F3 is 1.21, f1/f2 is 1.08, f3/f2 is 0.17, f1/f3 is 6.31, and R6/R7 is 5.85.

FIGS. 26, 27, 28a and 28b are respectively a plot of the optical modulation transfer function MTF, a schematic diagram of dispersion spots, field curvature and distortion diagrams of the eyepiece optical assembly according to Example 7 of the present invention, showing with a large field of view, a resolution value in the schematic diagram of the modulation transfer function MTF at 101p is greater than 0.94, and from the data above, it can be seen that compared to Examples above, changing the material of lenses and focal length of each lens group in conjunction with reasonable polarization control can produce higher imaging quality, small field curvature and optical distortion, and it is slightly superior in terms of total mass.

All the data of the above-mentioned Examples 1-7 satisfy the parameter requirements recorded in the Summary, and the results are shown in Table 8 below:

TABLE 8

|  | D1/D | D2/D | D1/D2 | F12/F | F3/F | F12/F3 | f1/f2 | f3/f2 | f1/f3 | R6/R7 |
|---|---|---|---|---|---|---|---|---|---|---|
| Example 1 | 0.65 | 0.28 | 0.43 | 1.18 | 1.62 | 0.73 | −3.05 | 0.26 | −11.88 | −4.83 |
| Example 2 | 0.67 | 0.26 | 0.39 | 1.14 | 1.75 | 0.65 | −2.89 | 0.29 | −9.88 | −3.16 |
| Example 3 | 0.61 | 0.33 | 0.55 | 1.18 | 1.89 | 0.63 | 1.99 | 0.29 | 6.96 | −5.07 |
| Example 4 | 0.73 | 0.20 | 0.28 | 1.10 | 1.98 | 0.56 | 33.21 | 0.42 | 79.84 | −6.13 |
| Example 5 | 0.47 | 0.53 | 1.12 | 1.80 | 1.13 | 1.59 | 1.85 | 0.13 | 13.81 | 1.21 |
| Example 6 | 0.49 | 0.51 | 1.03 | 1.66 | 1.30 | 1.27 | 1.14 | 0.16 | 6.97 | 1.66 |
| Example 7 | 0.50 | 0.50 | 0.99 | 1.61 | 1.33 | 1.21 | 1.08 | 0.17 | 6.31 | 5.85 |

It should be understood that, for one of ordinary skilled in the art, the foregoing description can be modified or altered, and all such modifications and alterations fall into the scope of the attached claims of the present invention.

What is claimed is:

1. An eyepiece optical assembly, comprising a first optics group, a second optics group and a third optics group arranged in sequence along an optical axis from a human eye viewing side to a miniature display;
the first optics group consists of a first lens group, a first polarizer group and a first waveplate group, the first lens group consists of a first lens and a second lens, the first lens, the first polarizer group, the second lens and the first waveplate group are arranged in sequence, the second optics group consists of a second lens group and a transflective optical surface arranged in sequence, and the third optics group consists of a third lens group, a second waveplate group and a second polarizer group; and both the second lens group and the third lens group are positive lens groups;
an optical focal length of the eyepiece optical assembly is F, a length from a first optical surface of the eyepiece optical assembly to the miniature display is D, a combined optical focal length of the first optics group and the second optics group is F12, a combined center thickness of the first optics group and the second optics group is D1, an optical focal length of the third optics group is F3, and a center thickness of the third optics group is D2;
F, F12, D1, F3, and D2 satisfy the following relations:

$1.1 \leq F12/F \leq 1.8;$ $1.13 \leq F3/F \leq 1.98;$ $0.56 \leq F12/F3 \leq 1.59;$ $0.47 \leq D1/D \leq 0.73;$ $0.2 \leq D2/D \leq 0.53;$ $0.28 \leq D1/D2 \leq 1.12;$ the first polarizer group includes a polarizer a in which light of one polarization state of P light and S light of natural light is reflected and light of the other polarization state transmits, and includes N polarizers bN in which light of one polarization state of P light and S light of natural light is absorbed and light of the other polarization state transmits, wherein N is a natural number;
the first waveplate group includes K waveplates cK with a quarter phase retardation for polarized light, and includes J waveplates dJ with a half phase retardation for polarized light, wherein K is a positive integer greater than or equal to 1, and J is a natural number;
the second waveplate group includes Z waveplates eZ with a quarter phase retardation for polarized light, and includes Y waveplates fY with a half phase retardation for polarized light, wherein Z is a positive integer greater than or equal to 1, and Y is a natural number;
the second polarizer group includes M polarizers gM in which light of one polarization state of P light and S light of natural light is absorbed and light of the other polarization state transmits, and includes X waveplates hX with a half phase retardation for polarized light, wherein M is a positive integer greater than or equal to 1, X is a natural number, and M is a positive integer greater than or equal to 1.

2. The eyepiece optical assembly according to claim 1, wherein an optical focal length of the first lens group is f1, an optical focal length of the second lens group is f2, and an optical focal length of the third lens group is f3;
f1, f2 and f3 satisfy the following relations:

$-3.05 \leq f1/f2 \leq 33.21;$ $0.13 \leq f3/f2 \leq 0.42;$ $-11.88 \leq f1/f3 \leq 79.84.$ 3. The eyepiece optical assembly according to claim 1, wherein a curvature radius of the last optical surface of the second optics group away from the human eye is R6, and a curvature radius of the first optical surface of the third optics group close to the human eye is R7; and R6 and R7 satisfy the following relation:

−6.13≤R6/R7≤5.85.

4. The eyepiece optical assembly according to claim 1, wherein materials of the optical lenses of the first lens group, the second lens group and the third lens group are glass or plastic resin.

5. The eyepiece optical assembly according to claim 1, wherein the optical surfaces of the first lens group, the second lens group and the third lens group include one or more of optical spherical surfaces, optical planes and optical even-order aspherical surfaces; and the even-order aspherical face shape satisfies the following relation:

$$Z = \frac{cr^2}{1+\sqrt{1-(1+k)c^2r^2}} + a_2 r^2 + a_4 r^4 + a_6 r^6 + \ldots;$$

wherein z is a vector height of the optical surface, c is a curvature at the aspherical vertex, k is an aspherical coefficient, α2, α4, α6 . . . are coefficients of various orders, and r is a distance coordinate from a point on a curved surface to an optical axis of the lens system.

6. The eyepiece optical assembly according to claim 1, wherein a polarizing angle of the polarizer a is θa, taking θa as a reference, polarizing angles of the polarizers b0, b1, b2, b3 . . . bN relative to the polarizer a are θb0, θb1, 0b2, 0b3 . . . θbN, polarizing angles of the waveplates c1, c2, c3 . . . cK relative to the polarizer a are θc1, θc2, θc3 . . . θcK, polarizing angles of the waveplates d0, d1, d2, d3 . . . dJ relative to the polarizer a are θd0, θd1, θd2, θd3 . . . θdJ, polarizing angles of the waveplates e1, e2, e3 . . . eZ relative to the polarizer a are θe1, θe2, θe3 . . . θeZ, polarizing angles of the waveplates f0, f1, f2, f3 . . . fY relative to the polarizer a are θf0, θf1, θf2, θf3 . . . θfY, polarizing angles of the polarizers g1, g2, g3 . . . gM relative to the polarizer a are θg1, θg2, θg3 . . . θgM, and polarizing angles of the waveplates h0, h1, h2, h3 . . . hX relative to the polarizer a are θh0, θh1, θh2, θh3 . . . θhX, wherein θbN, θcK, θdJ, θeZ, θfY, θgM and θhX satisfy the following relations:

|θbN|≤10°;

|θcK+θdJ−(J+1)45°|≤10°;

|θcK−θc(K−1)|≤10°;

|(15°/J)−θdl|≤3°;

|θeZ+θfY−(Y+1)45°|≤10°;

|θeZ−θe(Z−1)|≤10°;

|(15°/Y)−θf1|≤3°;

|θgM|≤10°;

|θhX−θh(X−1)|≤10°.

7. The eyepiece optical assembly according to claim 1, wherein the waveplate cK and waveplate dJ are attached together and located between glued surfaces formed by gluing the first optical surface of the first optics group close to the miniature display side and the first optical surface of the second optics group close to the human eye side.

8. The eyepiece optical assembly according to claim 1, wherein along the optical axis from the human eye viewing side to the miniature display, the waveplate eZ and the waveplate fY are located upstream the polarizer gM and the waveplate hX.

9. The eyepiece optical assembly according to claim 1, wherein the first polarizer group, the second polarizer group, the first waveplate group and the second waveplate group are all made of plastic resin.

10. The eyepiece optical assembly according to claim 1, wherein the optical surface of the second lens close to the human eye side is concave to the human eye and convex to the miniature display.

11. The eyepiece optical assembly according to claim 1, wherein the glue or material used in the gluing and attaching process is optical grade adhesive material.

12. An eyepiece optical system, comprising the eyepiece optical assembly according to claim 1.

13. An eyepiece optical device, comprising two miniature displays corresponding to positions of left and right eyes of a person respectively, further comprising the optical system as claimed in claim 12, the optical system is arranged at a position between the human eye and the miniature display, and projects an image displayed by the miniature display into the human eye with characteristics of high image quality, low distortion, and large field-of-view angle.

14. The eyepiece optical device according to claim 13, wherein the miniature display is an organic electroluminescent device or a transmissive liquid crystal display.

* * * * *